(12) United States Patent
Yamase et al.

(10) Patent No.: US 9,314,726 B2
(45) Date of Patent: Apr. 19, 2016

(54) CASE STRUCTURE FOR FLUID PRESSURE DEVICE

(75) Inventors: Norihide Yamase, Moriya (JP); Daisuke Oikawa, Abiko (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/116,647

(22) PCT Filed: Jul. 21, 2011

(86) PCT No.: PCT/JP2011/067176
§ 371 (c)(1),
(2), (4) Date: Nov. 8, 2013

(87) PCT Pub. No.: WO2012/153430
PCT Pub. Date: Nov. 15, 2012

(65) Prior Publication Data
US 2014/0124054 A1    May 8, 2014

(30) Foreign Application Priority Data

May 9, 2011    (JP) ................................. 2011-104623

(51) Int. Cl.
*B01D 46/24*    (2006.01)
*B01D 36/00*    (2006.01)
(Continued)

(52) U.S. Cl.
CPC .......... *B01D 46/2414* (2013.01); *B01D 36/006* (2013.01); *B01D 46/0004* (2013.01);
(Continued)

(58) Field of Classification Search
CPC .... B01D 36/06; B01D 46/04; B01D 46/2414; B01D 2201/309; B01D 2201/4084

USPC ............... 96/416–417, 419; 95/273; 197/375; 55/418, 498, 502
See application file for complete search history.

(56) References Cited

U.S. PATENT DOCUMENTS 2,925,883 A    2/1960    Everett
3,182,750 A    5/1965    Gleason et al.
(Continued)

FOREIGN PATENT DOCUMENTS

CA    2 745 560 A1        6/2010
CA    2745560 A1 *     6/2010
(Continued)

OTHER PUBLICATIONS

Combined Office Action and Search Report issued Jul. 31, 2014, in Chinese Patent Application No. 201180070746.4 with English translation.
(Continued)

*Primary Examiner* — Jason M Greene
*Assistant Examiner* — Karla Hawkins
(74) *Attorney, Agent, or Firm* — Oblon, McClelland, Maier & Neustadt, L.L.P.

(57) ABSTRACT

In a case structure for a fluid pressure device, a filter that constitutes part of a fluid pressure unit is equipped with a first body, a case unit connected to a lower portion of the first body, and a filter unit accommodated in the interior of the case unit. The case unit is made up from an outer case, which is formed as a bottomed cylinder from a light-permeable transparent material, and an inner case inserted into the interior of the outer case. Additionally, by insertion of the case unit into an installation hole that opens on a lower portion of the first body and rotating the case unit, projections and retaining walls provided on an outer circumferential surface of the case unit engage with support members provided in the installation hole, thus placing the case unit in a connected state.

9 Claims, 13 Drawing Sheets

(51) Int. Cl.
  *B01D 46/00* (2006.01)
  *B01D 46/42* (2006.01)
  *F15B 21/04* (2006.01)

(52) U.S. Cl.
  CPC ...... *B01D46/4254* (2013.01); *B01D 2201/291* (2013.01); *B01D 2201/295* (2013.01); *B01D 2201/307* (2013.01); *B01D 2201/309* (2013.01); *B01D 2201/4084* (2013.01); *F15B 21/048* (2013.01); *Y10T 137/7036* (2015.04)

(56) References Cited

U.S. PATENT DOCUMENTS

| | | |
|---|---|---|
| 3,214,054 A | 10/1965 | Poethig et al. |
| 3,507,098 A | 4/1970 | Veres et al. |
| 3,578,407 A | 5/1971 | Arnold et al. |
| 4,215,790 A | 8/1980 | Ribble et al. |
| 4,234,014 A | 11/1980 | Knight |
| 4,333,580 A | 6/1982 | Sweigart, Jr. |
| 4,707,168 A | 11/1987 | Mizutani |
| 4,735,288 A | 4/1988 | Uematsu et al. |
| 4,774,853 A | 10/1988 | Takahashi |
| 4,822,387 A | 4/1989 | Daniels |
| 5,122,167 A | 6/1992 | Daniels |
| 5,277,157 A | 1/1994 | Teich |
| 5,676,273 A | 10/1997 | Jonkers et al. |
| 5,755,842 A | 5/1998 | Patel et al. |
| 5,876,600 A | 3/1999 | Matsubara et al. |
| 6,039,778 A | 3/2000 | Coulonvaux |
| 6,391,197 B1 | 5/2002 | Billiet |
| 6,402,798 B1 | 6/2002 | Kallsen et al. |
| 6,436,162 B1 | 8/2002 | Wake et al. |
| 6,709,474 B2 | 3/2004 | Zaffetti et al. |
| 6,818,045 B2 | 11/2004 | Welker |
| 7,025,385 B2 | 4/2006 | Drescher |
| 7,442,222 B2 | 10/2008 | Dworatzek et al. |
| 7,850,756 B1 | 12/2010 | Senetar, III |
| 7,976,603 B2 | 7/2011 | Bauder et al. |
| 8,512,563 B2 | 8/2013 | Hirsch et al. |
| 2005/0081497 A1 | 4/2005 | Connor et al. |
| 2005/0229785 A1* | 10/2005 | Jachmann ..................... 95/273 |
| 2005/0235620 A1 | 10/2005 | Connor et al. |
| 2006/0016769 A1 | 1/2006 | Hacker et al. |
| 2006/0086075 A1 | 4/2006 | Scott et al. |
| 2007/0066215 A1 | 3/2007 | Song et al. |
| 2007/0209341 A1 | 9/2007 | Pearson et al. |
| 2009/0229231 A1 | 9/2009 | Treyz |
| 2010/0224065 A1 | 9/2010 | Clarke et al. |
| 2011/0296999 A1 | 12/2011 | Foerster et al. |
| 2013/0055693 A1 | 3/2013 | Clarke et al. |

FOREIGN PATENT DOCUMENTS

| | | |
|---|---|---|
| CN | 101056686 A | 10/2007 |
| DE | 30 18 158 A1 | 11/1980 |
| DE | 202004005983 | 7/2004 |
| DE | 202007011389 | 11/2007 |
| JP | 5 9618 | 2/1993 |
| JP | 5-51411 U | 7/1993 |
| JP | 11-267434 A | 10/1999 |
| JP | 2005-211886 A | 8/2005 |
| JP | 2008 188489 | 8/2008 |
| JP | 2010-172821 | 8/2010 |
| KR | 10-2004-0107508 A | 12/2004 |
| TW | 202751 | 3/1993 |
| TW | 201010789 | 3/2010 |
| WO | 2010 070102 | 6/2010 |

OTHER PUBLICATIONS

U.S. Appl. No. 14/116,555, filed Nov. 8, 2013, Yamase, et al.
International Search Report Issued Feb. 2, 2012 in PCT/JP11/067176 Filed Jul. 21, 2011.
Written Opinion of the International search Authority Issued Feb. 2, 2012 in PCT JP11/067176 Filed Jul. 21, 2011.
U.S. Office Action mailed Jan. 15, 2015 in co-pending U.S. Appl. No. 14/116,555.
Japanese Office Action dated Feb. 3, 2015, issued in Japanese Patent Application No. 2011-104627, with partial English translation.
Notice of Allowance issued May 7, 2015 in Japanese Patent Application No. 2011-104627 (with partial English language translation).
U.S. Office Action mailed Jul. 30, 2015 in co-pending U.S. Appl. No. 14/116,555.
Office Action issued Sep. 4, 2015 in German Patent Application No. 11 2011 105 229.4.
Korean Office Action issued Sep. 18, 2015 in Patent Application No. 10-2013-7029328 (with Partial English Translation).
Korean Office Action issued Sep. 23, 2015 in Patent Application No. 10-2013-7029329 (with Partial English Translation).
Taiwanese Office Action dated Dec. 21, 2015, with English translation, issued in corresponding Taiwanese Patent Application No. 100126150, citing document AO therein.

* cited by examiner

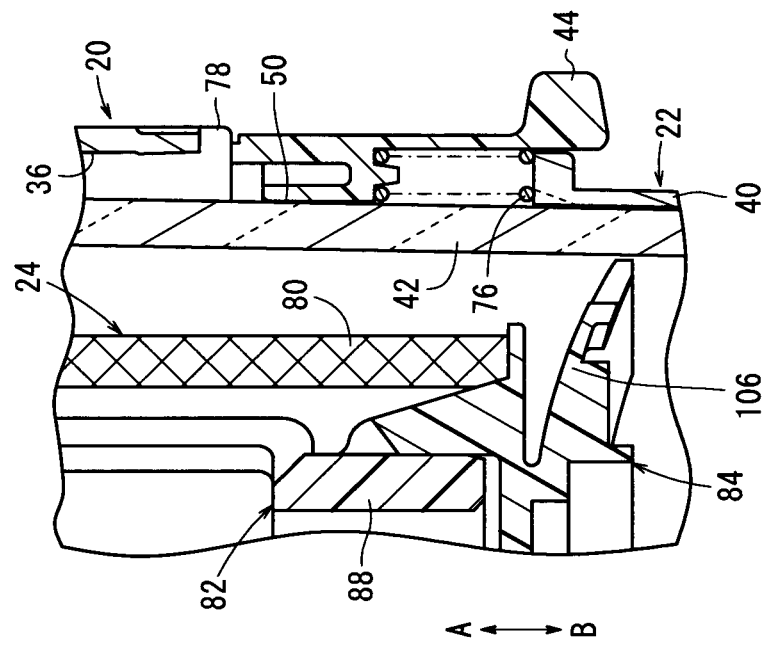
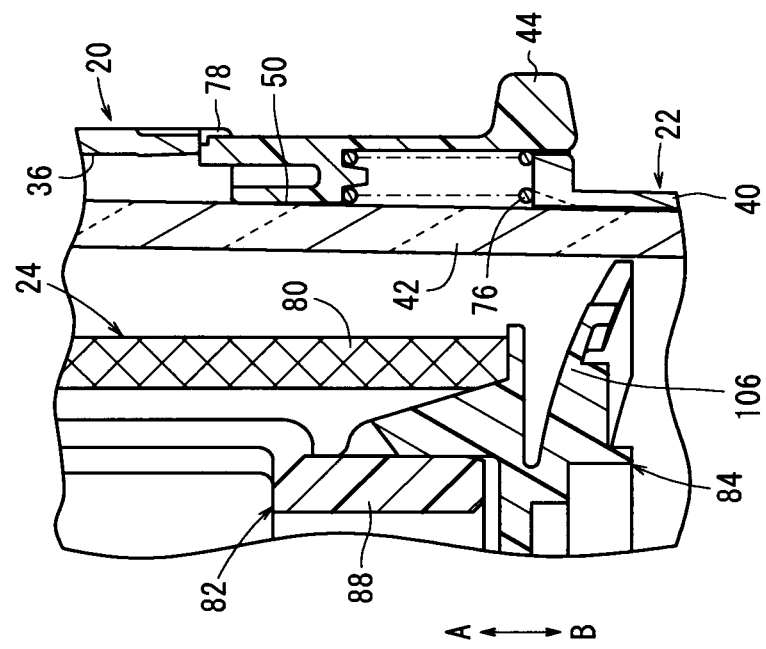

CASE STRUCTURE FOR FLUID PRESSURE DEVICE

TECHNICAL FIELD

The present invention relates to a case structure used in a fluid pressure device through which a pressure fluid flows through the interior thereof.

BACKGROUND ART

As disclosed in Japanese Laid-Open Utility Model Publication No. 05-009618, the present applicant has proposed a filter (fluid pressure device) for removing dust, particulates and the like contained in a pressure fluid. The filter comprises a body having ports therein for supply and discharge of the pressure fluid, a hollow case disposed on a lower portion of the body, and a filter element, which is capable of removing dust and the like, accommodated inside the case. Further, a case cover, which covers the case, is provided on an outer circumferential side of the case. A confirmation window is provided in the case cover for allowing confirmation from the exterior of the condition of the filter element inside the case.

SUMMARY OF INVENTION

A general object of the present invention is to provide a case structure for a fluid pressure device, which enables a case to be reliably and easily connected with respect to a body, which allows the case interior to reliably and easily be viewed from the exterior, and which is capable of enhancing durability of the case.

The present invention is a case structure for a fluid pressure device having a case into which a pressure fluid is introduced to an interior thereof, the fluid pressure device comprising:

a body having ports through which the pressure fluid is supplied and discharged; and the case formed as a bottomed cylinder, which is connected to an installation hole of the body, the interior of the case communicating with the ports, wherein the case is light-permeable so as to enable visibility of an interior thereof, and includes a first case portion and a second case portion disposed in an interior of the first case portion, and wherein a first engagement member, which is disposed on an outer circumferential surface of at least one of the first case portion and the second case portion, engages with a second engagement member formed on an inner circumferential surface of the installation hole.

According to the present invention, in the fluid pressure device, the case into which the pressure fluid is introduced to the interior thereof is formed to be light-permeable to enable visibility of the interior. In addition, the fluid pressure device is constituted by the first case portion and the second case portion, which is disposed in the interior of the first case portion. Together therewith, first engagement members are provided on the outer circumferential surface of the case, and second engagement members are formed in the installation hole of the body, whereby the case and the body can be connected by engagement of the first engagement members with the second engagement members.

Accordingly, by engagement of the case with the second engagement members that are formed in the installation hole of the body, the case can reliably and easily be connected with respect to the body. Together therewith, because the interior of the case is visible from the exterior, the condition of (e.g., the amount of dust or moisture contained in) the pressure fluid introduced to the interior can reliably and easily be confirmed from the entire outer circumferential surface of the case.

Further, because the second case portion is disposed in the interior of the first case portion, and the second case portion is not exposed to the exterior, for example, gas, solvents or the like that may be present in the installation environment of the fluid pressure device can be prevented from coming into contact with and adhering with respect to the second case portion. Owing thereto, the durability of the second case portion can be improved.

The above and other objects, features, and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 8A is a cross sectional view taken along line VIIIA-VIIIA of FIG. 2;

FIG. 8B is a cross sectional view showing a condition in which a release button in FIG. 8A is lowered and a rotation regulated state between a first body and a case unit is released;

DESCRIPTION OF EMBODIMENTS

Figure 1:
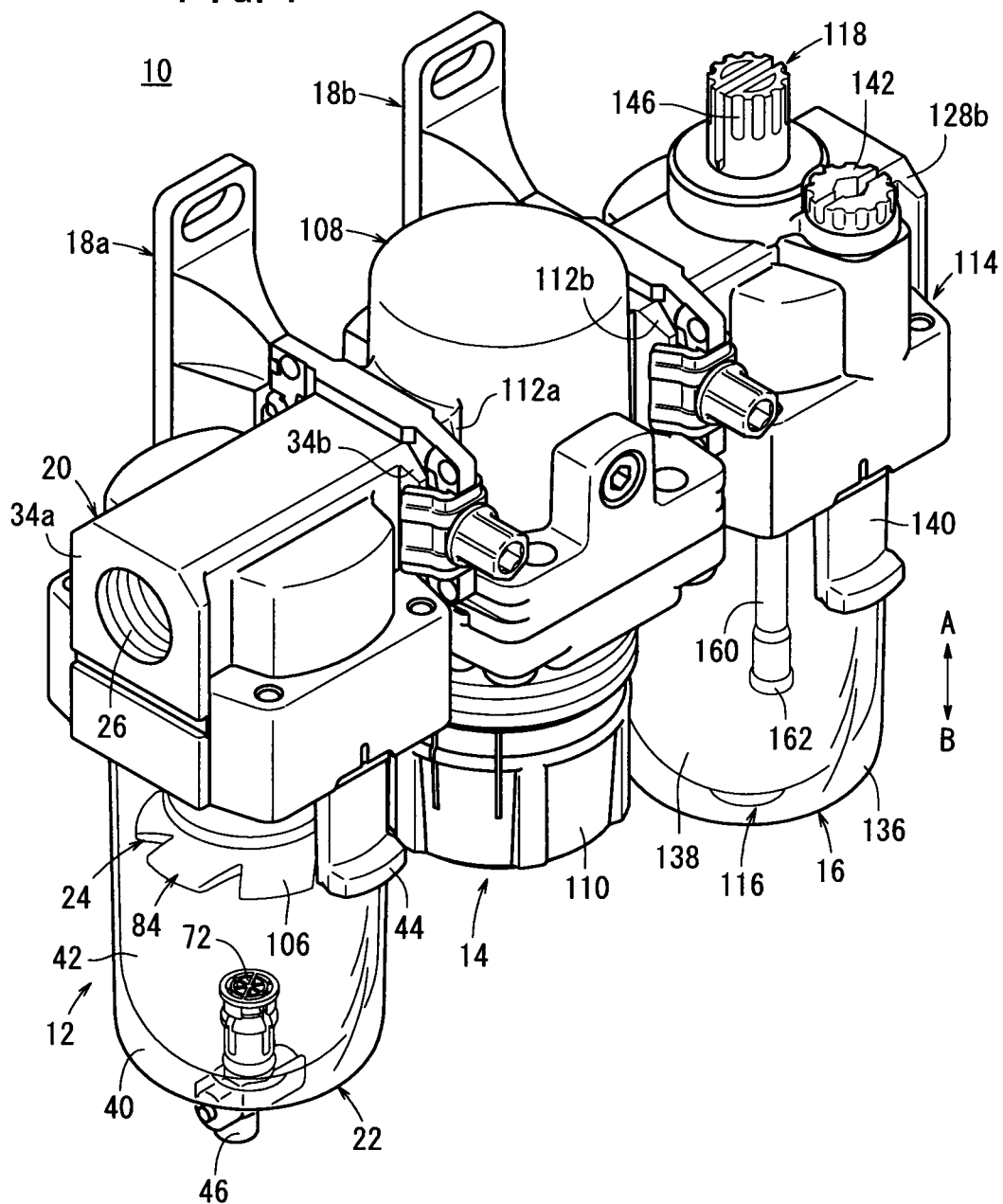
FIG. 1 is an exterior perspective view of a fluid pressure unit to which a case structure according to a first embodiment of the present invention is applied.

In FIG. 1, reference numeral 10 indicates a fluid pressure unit including fluid pressure devices to which the case structure according to the first embodiment of the present invention is applied.

Figure 2:
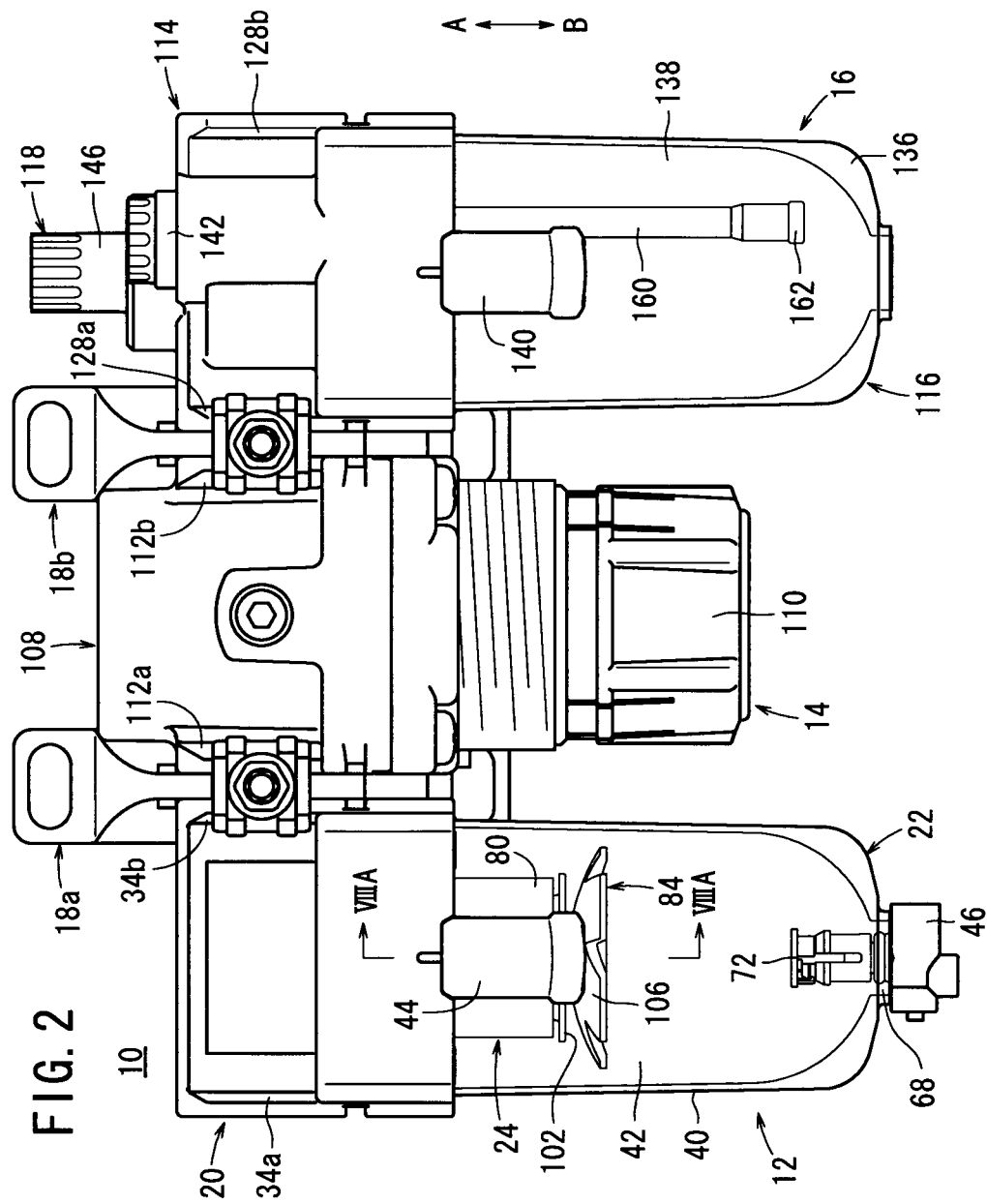
FIG. 2 is a front view of the fluid pressure unit shown in FIG. 1.

As shown in FIGS. 1 and 2, the fluid pressure unit 10 is made up from a filter 12 that removes dust, particulates and the like contained within the pressure fluid, a regulator 14 that reduces the pressure of the pressure fluid, a lubricator 16 that mixes a lubricating oil with respect to the pressure fluid, and connectors 18a, 18b that connect the filter 12, the regulator 14, and the lubricator 16 together mutually.

The aforementioned filter 12, the regulator 14, and the lubricator 16 function as fluid pressure devices to which a pressure fluid is supplied to the interiors thereof. The regulator 14 is disposed between the filter 12 and the lubricator 16.

As shown in FIGS. 1 to 7, the filter 12 includes a first body (body) 20, a case unit (case) 22 connected to a lower part of the first body 20, and a filter unit 24 that is installed in the interior of the case unit 22.

Figure 4:
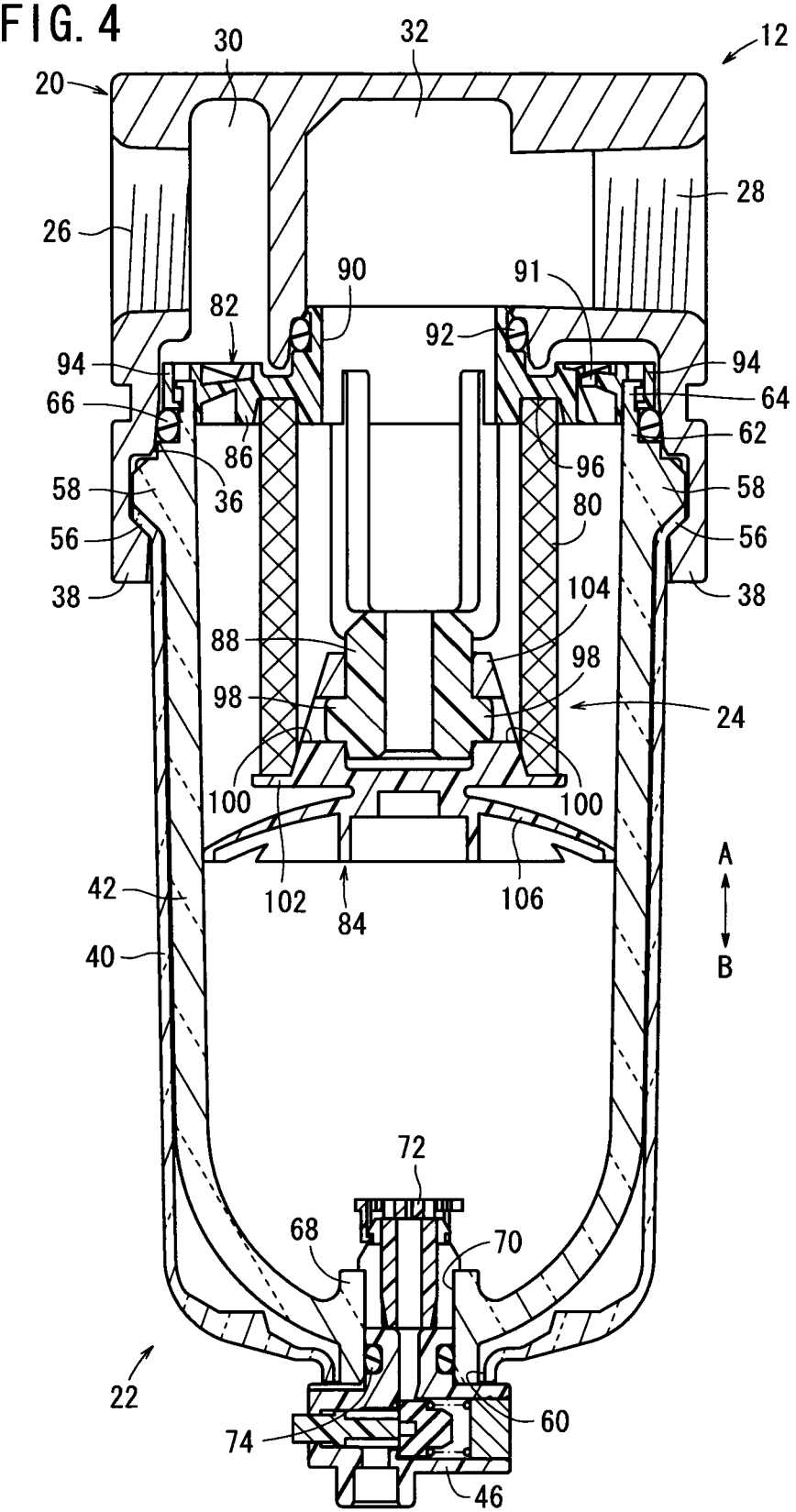
FIG. 4 is an overall cross sectional view of the filter shown in FIG. 3.

First and second ports (ports) 26, 28 for supply and discharge of a pressure fluid are provided laterally, i.e., on respective sides, of the first body 20, the first and second ports 26, 28 opening roughly in a horizontal direction (see FIG. 4). The first port 26 is connected to a non-illustrated tube, and the pressure fluid is supplied through such a tube. The first port 26 communicates with a first communication passage 30 that extends in the axial direction (the direction of arrows A and B) through the interior of the first body 20.

The second port 28 discharges the pressure fluid supplied through the first port 26 into a later-described regulator 14. The second port 28 communicates with a second communication passage 32 that extends in the axial direction (the direction of arrows A and B) through the interior of the first body 20.

Further, pairs of engagement projections 34a, 34b, which are each formed in a mutual confronting relation on outer edges of end surfaces on which the first and second ports 26, 28 are provided, are disposed on side surfaces of the first body 20.

An installation hole 36 into which the case unit 22 is inserted opens on a lower part of the first body 20. The first communication passage 30 communicates with an outer circumferential side of the installation hole 36, which is formed with a roughly circular shape in cross section, whereas the second communication passage 32 communicates with a central portion of the installation hole 36.

Figure 3:
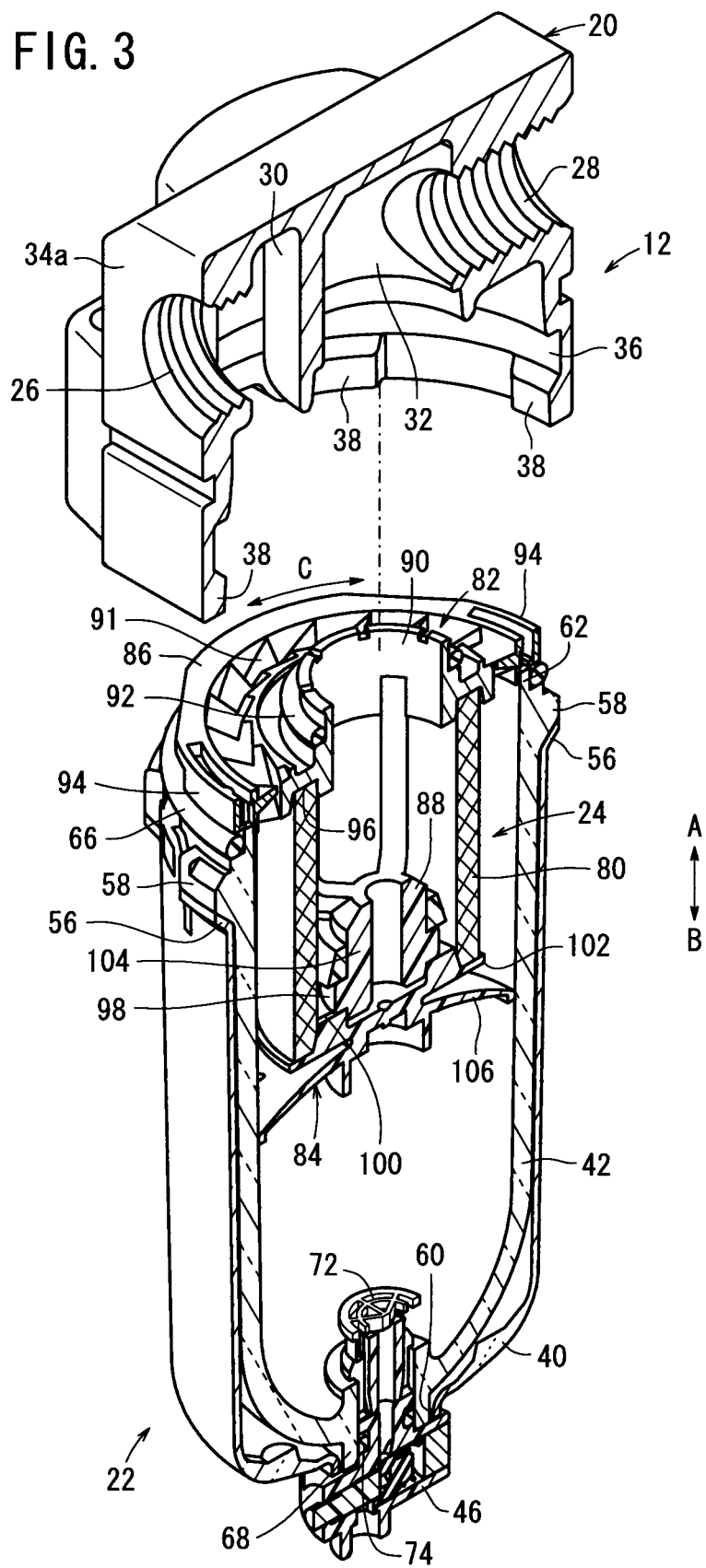
FIG. 3 is an exploded sectional perspective view of a filter that constitutes part of the fluid pressure unit of FIG. 1.

As shown in FIGS. 3 and 4, a plurality of support members (second engagement members) 38, which project radially inward, are formed on the inner circumferential surface of the installation hole 36. Projections (first engagement members) 58 of an inner case (second case portion) 42 that constitutes the case unit 22, and retaining walls (first engagement members) 56 of an outer case (first case portion) 40 are engaged with the support members 38. The support members 38 are separated by equal intervals mutually along the circumferential direction of the installation hole 36.

The case unit 22 includes the outer case 40 formed as a bottomed cylinder, and the inner case 42 that is inserted into an interior of the outer case 40, a release button (operation button) 44 disposed for displacement with respect to the outer case 40, and a drain cock 46 disposed on bottom parts of the outer case 40 and the inner case 42.

The outer case 40 is formed with a substantially constant diameter and a predetermined length in the axial direction (the direction of arrows A and B) from a light-permeable transparent resin material (acrylic, polycarbonate, etc.). A bottom portion of the outer case 40 is formed in a hemispherical shape, and the upper end of the outer case 40 opens upwardly.

A pair of connecting tongues 48a, 48b (see FIG. 6) that project upwardly (in the direction of the arrow A) in the axial direction are formed on an upper portion of the outer case 40, and a button hole 50 in which the later-described release button 44 is mounted is formed at a position located between one of the connecting tongues 48a and the other of the connecting tongues 48b. The connecting tongues 48a, 48b are capable of being deformed in radial directions of the outer case 40. Holes 54, with which respective projections 52 of the inner case 42 are engageable, are disposed in roughly central portions of the connecting tongues 48a, 48b. The holes 54 open in roughly rectangular shapes.

Further, the button hole 50, which is formed as a roughly rectangular cutout, extends in the axial direction downwardly (in the direction of the arrow B) from the upper edge of the outer case 40.

Furthermore, a plurality of retaining walls 56, which gradually expand in diameter in a radially outward direction, are formed on an upper portion of the outer case 40. The retaining walls 56 are separated mutually by substantially equal intervals along the circumferential direction of the outer case 40, such that the projections 58 are capable of being retained by the retaining walls 56 if the inner case 42 is accommodated inside the outer case 40.

On the other hand, a boss hole 60, into which a drain boss 68 (described later) of the inner case 42 is inserted, is formed in a substantially central location along the axis on a bottom part of the outer case 40.

The inner case 42, similar to the outer case 40, is formed with a substantially constant diameter, for example, from a light-permeable transparent resin material (polycarbonate or the like) and extends a predetermined length along the axial direction (the direction of arrows A and B). A bottom portion of the inner case 42 is formed in a hemispherical shape, and the upper end thereof opens upwardly. The outer diameter of the inner case 42 is equal to or set slightly smaller than the inner diameter of the outer case 40 (see FIG. 4). Additionally, the inner case 42 is accommodated in the interior of the outer case 40, such that the inner case 42 is not exposed to the exterior of the outer case 40.

Further, a plurality of projections 58, which project radially outward from the outer circumferential surface thereof, are formed on an upper portion of the inner case 42, the projections 58 being disposed at substantially equal intervals mutually along the circumferential direction of the inner case 42. The numbers of projections 58 and retaining walls 56 are set at the same numbers as the support members 38 of the first body 20, and the interval between the adjacent projections 58 and retaining walls 56 is set to be the same as the interval between the adjacent support members 38.

Inclined surfaces, which are tilted upwardly, are provided on lower portions of the projections 58, whereas the projections 58 have flat shapes extending substantially horizontally on upper surfaces of the projections 58. In addition, if the inner case 42 is accommodated inside the outer case 40, the inclined surfaces of the projections are retained in abutment respectively against the retaining walls 56.

Further, between two adjacent projections 58, a pair of projections 52 are provided, which project outwardly at a predetermined height with respect to the outer circumferential surface of the inner case 42, such that on an occasion where the inner case 42 is assembled with respect to the outer case 40, the projections 52, which are formed with substantially rectangular shapes in cross section, engage with the holes 54 of the connecting tongues 48a, 48b. Owing thereto, the outer case 40 and the inner case 42 are connected together strongly by the pair of connecting tongues 48a, 48b.

Furthermore, an annular wall 62, which is reduced in diameter in a radially inward direction with respect to the outer circumferential surface of the inner case 42, is formed on an upper part of the inner case 42. A plurality of hooks 64, which project outwardly from the upper part thereof, are disposed on the annular wall 62, and together therewith, a first sealing ring 66 made up from an elastic material is installed on an outer circumferential side of the annular wall 62. The hooks 64 are spaced at equal intervals mutually along the circumferential direction of the inner case 42, upper ends of the hooks 64 projecting in radially outward directions. Stated otherwise, the upper ends of the hooks 64 are L-shaped in cross section and project radially outward.

A deflector 82 (described later), which constitutes part of the filter unit 24, is retained by the hooks 64 if the filter unit 24 is accommodated in the interior of the case unit 22 including the inner case 42.

On the other hand, a drain boss 68, which projects in the axial direction (the direction of arrows A and B) at a substantially central portion on the axis, is formed on the bottom part of the inner case 42. A drain hole 70 in which the drain cock 46 is inserted is formed in the interior of the drain boss 68.

In addition, on an occasion where the inner case 42 is assembled with respect to the outer case 40, after the drain boss 68 of the inner case 42 has been inserted into the boss hole 60 of the outer case 40, the drain cock 46 is inserted (e.g., lightly press-fitted) into the drain hole 70, and fixed from the interior of the inner case 42 by a fixing plug 72.

A second sealing ring 74 made of an elastic material is mounted via an annular groove on an outer circumferential surface of the drain cock 46, such that upon insertion of the second sealing ring 74 into the drain hole 70, and by abutment thereof against the inner circumferential surface of the drain hole 70, leakage of pressure fluid between the drain cock 46 and the drain hole 70 is prevented.

The release button 44 is made up from a block that is L-shaped in cross section, which is installed in the button hole 50, such that a projecting region thereof is positioned on an outer side of the outer case 40 and a lower side of the release button 44 (in the direction of the arrow B). The release button 44 is disposed for displacement in upward and downward directions (the directions of arrows A and B) along the button hole 50, with a spring 76 being interposed between the release button 44 and a lower end surface of the button hole 50. Thus, the release button 44 is normally in a state of being biased upwardly on the outer case 40 (in the direction of the arrow A).

Additionally, if the case unit 22 is installed with respect to the installation hole 36 of the first body 20, the upper end of the release button 44 is inserted into a recess 78 (see FIG. 8A) that is formed in the installation hole 36 of the first body 20. Owing thereto, displacement in a rotational direction of the case unit 22 with respect to the first body 20 is regulated.

Stated otherwise, the release button 44 functions as a stopper member for regulating rotational displacement of the case unit 22, in a state in which the case unit 22 is connected with respect to the first body 20.

As shown in FIGS. 3 through 5 and 7, the filter unit 24 includes a cylindrical shaped filter element 80, the deflector 82 that retains the filter element 80, and a baffle 84 that is installed on an end of the deflector 82. The filter element 80 is formed as a cylinder on which fibers of, for example, polypropylene, polyethylene or the like, are wound having a predetermined thickness in the radial direction.

The deflector 82 is equipped with a disk-shaped main body 86, and a retaining member 88 formed on a lower part of the main body 86 and which is capable of retaining the baffle 84. A through hole 90 penetrates through a substantially central part of the main body 86, and multiple fins 91 are formed on the outer circumferential side of the through hole 90. The fins 91 are separated at equal intervals mutually along the circumferential direction of the deflector 82, and are formed so as to be inclined at a predetermined angle with respect to the axial direction of the deflector 82.

Further, a third sealing ring 92 made of an elastic material is mounted on an outer circumferential side of the through hole 90 in the main body 86. The third sealing ring 92 abuts against an inner circumferential surface of the second communication passage 32, under a condition in which the filter unit 24 is installed in the first body 20 together with the case unit 22. Owing thereto, leakage of pressure fluid between the filter unit 24 and the second communication passage 32 is prevented.

Further, plural (e.g., four) guide walls 94 are formed on the main body 86, which project downwardly (in the direction of the arrow B) on an outer edge portion that defines the outer circumferential side of the fins 91. The guide walls 94 are separated at equal intervals mutually along the circumferential direction of the main body 86, and are separated a predetermined interval in the radial direction with respect to the outer edge portion. Further, the lower ends of the guide walls 94 are L-shaped in cross section, and are folded in a radial inward direction.

Additionally, if the filter unit 24 is assembled with respect to the case unit 22, the hooks 64 of the inner case 42 are inserted into the inner circumferential sides of the guide walls 94, whereby the lower ends of the guide walls 94 and the upper ends of the hooks 64 overlap one another in the radial direction (see FIG. 4). Owing thereto, displacement in the axial direction (the direction of arrows A and B) of the inner case 42 and the filter unit 24 including the deflector 82 is regulated. Consequently, the filter unit 24 is connected in a state of being accommodated in the interior of the case unit 22.

On the other hand, a filter groove 96 into which the upper end of the filter element 80 is inserted is formed in an annular shape on a lower surface of the main body 86.

The retaining member 88 is formed in a cylindrical shape and is connected with respect to the main body 86, together with being disposed at a predetermined interval from the main body 86 in the axial direction (the direction of the arrow B). In addition, a pair of pins 98 project from an outer circumferential side on the retaining member 88, and by insertion of the pins 98 into grooves 100 of the later-described baffle 84, the baffle 84 is connected with respect to the retaining member 88. Further, the cylindrically shaped filter element 80 is inserted over an outer circumferential side of the retaining member 88.

The baffle 84 includes a disk-shaped base 102, a connector 104 formed on an upper portion of the base 102 and connected to the retaining member 88 of the deflector 82, and a skirt 106 formed on a lower portion of the base 102. The base 102 is formed in a substantially planar shape, and a lower end surface of the filter element 80 abuts against and is retained by the upper surface of the base 102. The connector 104 is formed with a conical shape in cross section, tapering gradually in an upward direction. The pair of grooves 100 extends in a circumferential direction along a wall surface of the connector 104.

In addition, under a condition in which the retaining member 88 of the deflector 82 is inserted through the filter element 80, after the retaining member 88 has been inserted into the interior of the connector 104 and the pins 98 have been inserted respectively into the grooves 100, the retaining member 88 and the baffle 84 are rotated circumferentially a predetermined angle in mutually opposite directions. Consequently, the pins 98 are moved to the ends of the grooves 100 and become engaged therewith. As a result, relative displacement in the axial direction (the direction of arrows A and B) between the deflector 82 and the baffle 84 is regulated, and the baffle 84 is connected with respect to the retaining member 88 under a state in which the filter element 80 is retained between the deflector 82 and the baffle 84.

As shown in FIGS. 1 and 2, the regulator 14 comprises a second body 108, a handle 110 rotatably disposed on a lower part of the second body 108, and an adjustment mechanism (not shown), which is capable of adjusting the pressure fluid by operating the handle 110. A pair of ports (not shown) for supply and discharge of a pressure fluid are formed laterally, i.e. on respective sides, of the second body 108. One of the ports is connected to and communicates with the second port 28 of the filter 12 to which pressure fluid from the filter 12 is supplied, and the other of the ports is connected to and communicates with a third port 122 (described later) of the lubricator 16 through which the pressure fluid is discharged.

Further, pairs of engagement projections 112a, 112b are disposed on side surfaces of the second body 108, in mutual opposing relation on outer edges of end surfaces on which the pair of ports is provided. In a state in which the engagement projections 112a of the end surface that is connected with the second port 28 of the filter 12 abut against the engagement projections 34b of the adjacent filter 12, the engagement projections 34b, 112a are connected together mutually by installation of the connector 18a so as to cover outer sides of the engagement projections 34b, 112a. At this time, the second port 28 of the filter 12 and one of the ports on the regulator 14 are connected in a state of communication.

The regulator 14 is equipped with the pressure adjustment mechanism at the interior thereof. The pressure adjustment mechanism is operated by rotation of the handle 110, such that after the pressure of the pressure fluid supplied from the one port has been adjusted to a desired pressure, the pressure fluid is discharged from the other port and supplied to the lubricator 16.

The lubricator 16 is used with the aim of causing lubricating oil to be dripped into the pressure fluid, and which by using the flow of the pressure fluid, supplies the lubricating oil to slidable portions in other fluid pressure devices. As shown in FIGS. 1, 2, 9 and 10, the lubricator 16 includes a third body 114, a case unit 116 connected to a lower part of the third body 114, a dripping member 118 that is inserted into the interior of the third body 114, and a holder 120 for fixing the dripping member 118 with respect to the third body 114.

Third and fourth ports 122, 124 for supply and discharge of the pressure fluid are disposed laterally, i.e., on respective sides, of the third body 114. The third port 122 and the fourth port 124 communicate mutually through a third communication passage 126. The third port 122 is connected to another port in the regulator 14, which is disposed adjacent thereto, and the fourth port 124 is connected to an unillustrated tube.

Further, pairs of engagement projections 128a, 128b, which are each mutually opposed to one another on outer edges of end surfaces on which the third and fourth ports 122, 124 are provided, are disposed on side surfaces of the third body 114. Under a condition in which the engagement projections 128a on the end surface of the lubricator 16 facing the regulator 14 abut against the engagement projections 112b of the regulator 14, the engagement projections 112b, 128a are connected together mutually by installation of the connector 18b so as to cover outer sides of the engagement projections 112b, 128a. At this time, the third port 122 of the lubricator 16 is connected in a state of communication with the other port on the regulator 14.

Figure 9:
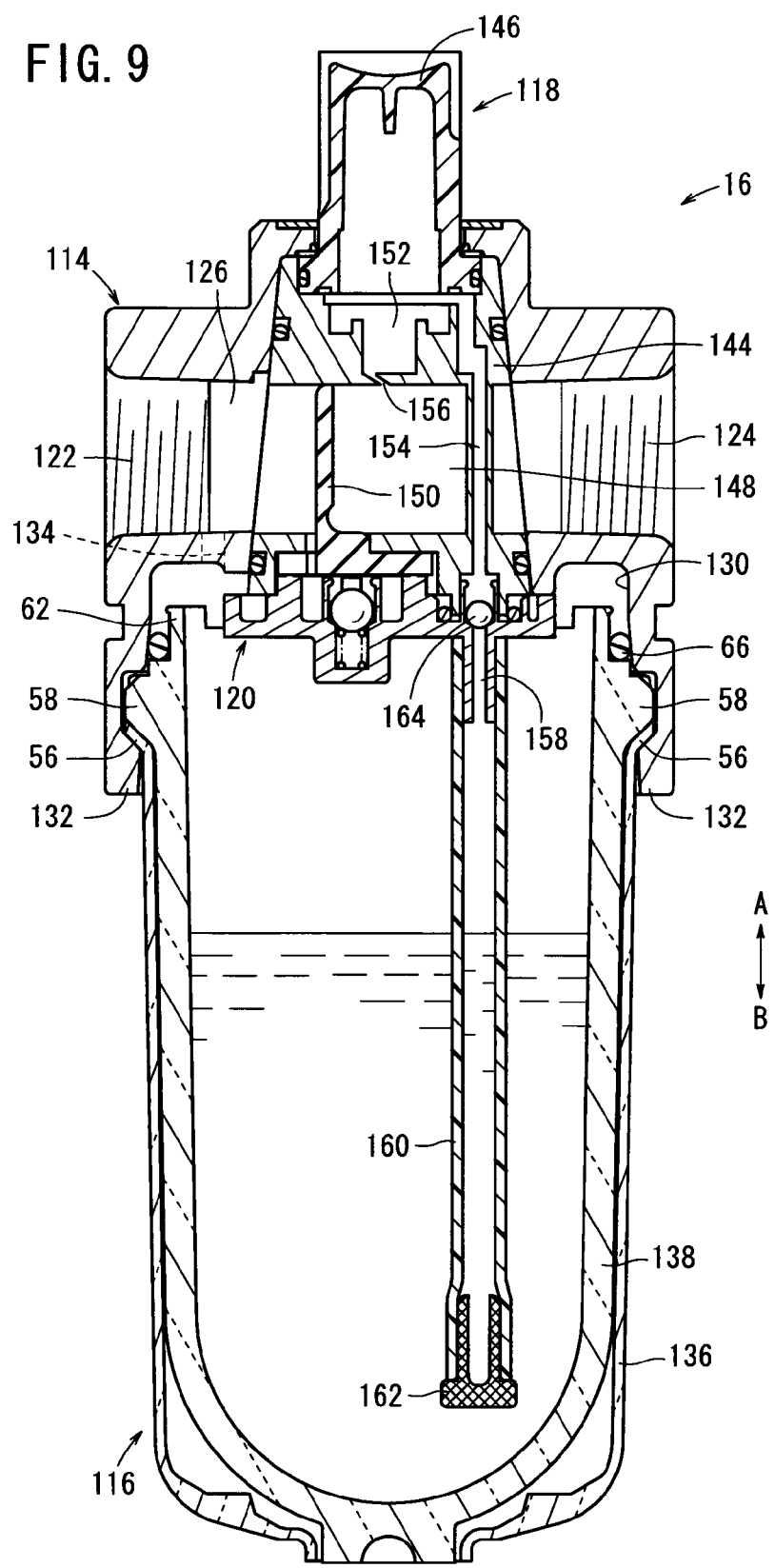
FIG. 9 is an overall cross sectional view of a lubricator that constitutes part of the fluid pressure unit of FIG. 1.
Figure 10:
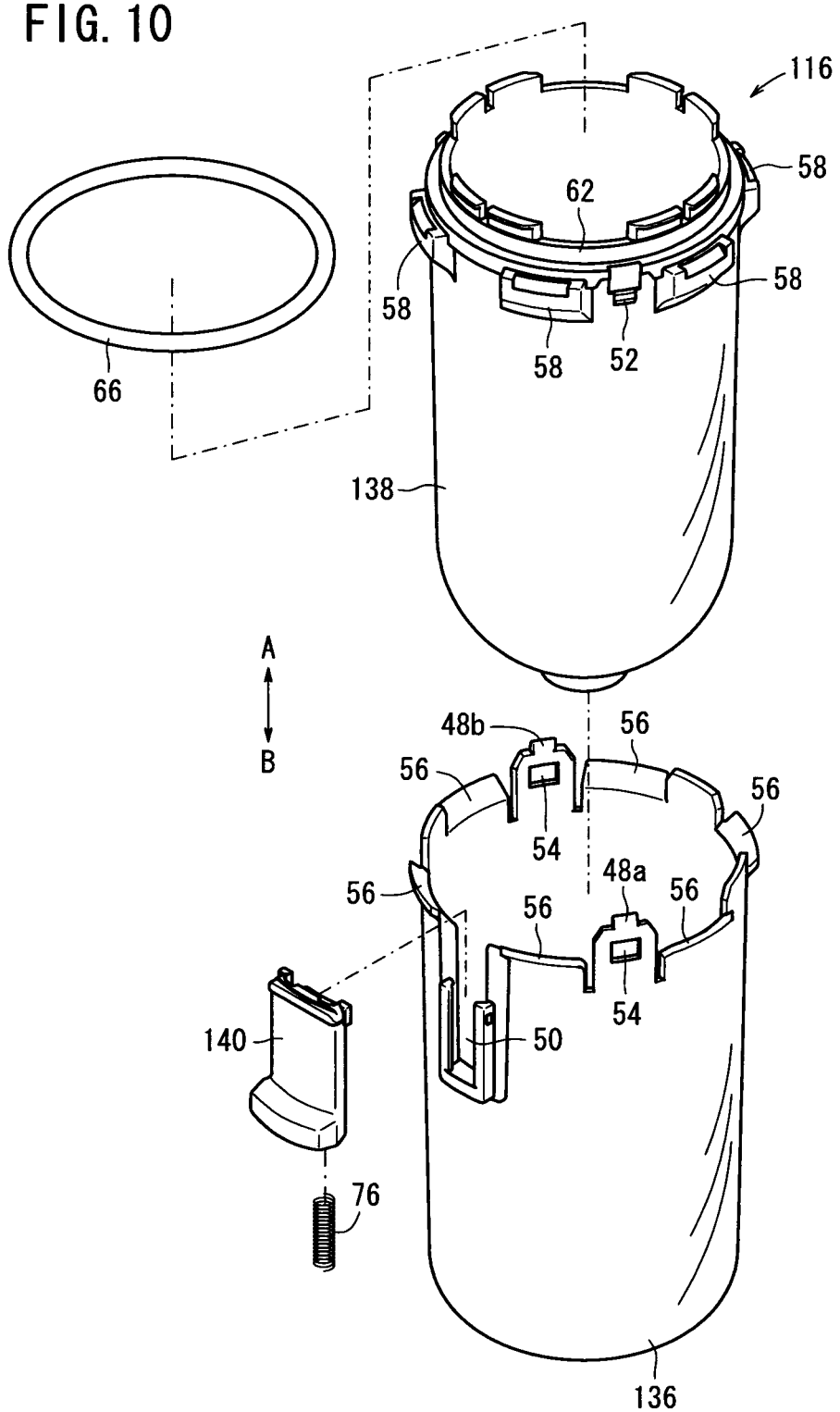
FIG. 10 is an exploded perspective view of a case unit that constitutes part of the lubricator of FIG. 1.

Furthermore, an installation hole 130 in which the case unit 116 is inserted opens on a lower part of the third body 114. As shown in FIG. 9, plural support members 132 that project radially inward are formed on an inner circumferential surface of the installation hole 130. Projections 58 of an inner case (second case portion) 138 and retaining walls 56 of the outer case (first case portion) 136 engage with the support members 132. The case unit 116 includes the inner case 138 and the outer case 136. The support members 132 are disposed so as to be separated by equal intervals mutually along the circumferential direction of the installation hole 130.

Further, a branch passage 134 that extends toward the side of the third port 122 (in the direction of the arrow A) is formed in the installation hole 130. A portion of the pressure fluid supplied to the third port 122 is supplied, via the branch passage 134, into the interior of the case unit 116 that is mounted in the installation hole 130.

The case unit 116 includes an outer case 136 formed as a bottomed cylinder, the inner case 138 inserted through the interior of the outer case 136, and a release button 140 that is displaceable with respect to the outer case 136. The inner case 138 is accommodated in the interior of the outer case 136 so as not to be exposed to the exterior of the outer case 136. Construction of the case unit 116 is roughly the same as that of the case unit 22 of the above-described filter 12. Thus, the same reference characters are applied to the same constituent elements thereof, and detailed descriptions of such features are omitted.

The outer case 136 is formed with a substantially constant diameter and a predetermined length in the axial direction from a light-permeable transparent resin material (acrylic, polycarbonate, etc.). A bottom portion of the outer case 136 is formed in a hemispherical shape, and the upper end of the outer case 136 opens upwardly. A pair of connecting tongues 48a, 48b that project upwardly (in the direction of the arrow A) in the axial direction are formed on an upper portion of the outer case 136, and a button hole 50 in which the later-described release button 140 is mounted is formed at a position located between one of the connecting tongues 48a and the other of the connecting tongues 48b.

Furthermore, a plurality of retaining walls 56, which gradually expand in diameter in a radially outward direction, are formed on an upper portion of the outer case 136. The retaining walls 56 are separated mutually by substantially equal intervals along the circumferential direction of the outer case 136, such that the projections 58 are capable of being retained by the retaining walls 56 if the inner case 138 is accommodated inside the outer case 136.

The inner case 138, similar to the outer case 136, is formed with a substantially constant diameter, for example, from a light-permeable transparent resin material (polycarbonate or the like) and extends a predetermined length in the axial direction. A bottom portion of the inner case 138 is formed in a hemispherical shape, and the upper end thereof opens upwardly. The interior of the inner case 138 is filled with lubricating oil through an oil supply plug 142 (see FIGS. 1 and 2), which is provided on the third body 114.

Further, a plurality of projections 58, which project radially outward from the outer circumferential surface thereof, are formed on an upper portion of the inner case 138, the projections 58 being disposed at substantially equal intervals mutually along the circumferential direction of the inner case 138. Inclined surfaces of the projections 58 come into abutment against and are retained respectively by the retaining walls 56 if the inner case 138 is accommodated inside the outer case 136.

Further, between two adjacent projections 58, a pair of projections 52 are provided, which project outwardly at a predetermined height with respect to the outer circumferential surface of the inner case 138. If the inner case 138 is assembled with respect to the outer case 136, the projections 52, which are formed with substantially rectangular shapes in cross section, engage within the holes 54 of the connecting tongues 48a, 48b. Owing thereto, the outer case 136 and the inner case 138 are connected together strongly.

Furthermore, an annular wall 62, which is reduced in diameter in a radially inward direction with respect to the outer circumferential surface of the inner case 138, is formed on an upper part of the inner case 138. A plurality of hooks 64, which project outwardly from the upper part thereof, are disposed on the annular wall 62, and together therewith, a first sealing ring 66 made up from an elastic material is installed on an outer circumferential side of the annular wall 62.

The release button 140 is made up from a block that is L-shaped in cross section, which is installed in the button hole 50, such that a projecting region thereof is positioned on an outer side of the outer case 136 and on a lower side of the release button 140 (in the direction of the arrow B). The release button 140 is disposed for displacement in upward and downward directions (the directions of arrows A and B) along the button hole 50, with a spring 76 being interposed between the release button 140 and a lower end surface of the button hole 50. Thus, the release button 140 is normally in a state of being biased upwardly on the outer case 136 (in the direction of the arrow A).

Additionally, if the case unit 116 is installed with respect to the installation hole 130 of the third body 114, the upper end of the release button 140 is inserted into a recess 78 that is formed in the installation hole 130 of the third body 114. Owing thereto, displacement in a rotational direction of the case unit 116 with respect to the third body 114 is regulated. Stated otherwise, the release button 140 functions as a stopper member for regulating rotational displacement of the case unit 116, in a state in which the case unit 116 is connected with respect to the third body 114.

As shown in FIG. 9, the dripping member 118 comprises an inner member 144 that is inserted in the interior of the third body 114, and a drip plug 146 that is provided on an upper portion of the inner member 144. The inner member 144 is inserted so as to penetrate through the third communication passage 126.

The inner member 144 includes a fourth communication passage 148 that penetrates therethrough horizontally. The fourth communication passage 148 is arranged on a straight line together with the third communication passage 126. More specifically, pressure fluid that is supplied to the third port 122 passes through the third and fourth communication passages 126, 148 and flows to the fourth port 124.

Further, a damper 150 made from an elastic material and which is disposed in an upstanding manner perpendicular to the direction of extension of the fourth communication passage 148 is disposed in the fourth communication passage 148. The damper 150 is disposed so as to be tiltable by a predetermined angle toward the side of the fourth port 124 corresponding to the flow amount of pressure fluid that is supplied from the third port 122.

A reservoir 152 through which lubricating oil is supplied from the inner case 138 is formed above the fourth communication passage 148 in the inner member 144. The reservoir 152 communicates with an oil passage 154 that extends downwardly, and lubricating oil is supplied through the oil passage 154. A drip opening 156 that communicates with the fourth communication passage 148 opens downwardly in a substantially central portion of the reservoir 152. The oil passage 154 is perpendicular with respect to the fourth communication passage 148, extends therethrough while being separated from the fourth communication passage 148, and communicates with an oil supply port 158 that is formed in the holder 120.

The holder 120 is installed on a lower portion of the inner member 144 that constitutes the dripping member 118, and retains a portion of the damper 150 interposed between the inner member 144 and the holder 120. The holder 120 comprises the oil supply port 158 which communicates with the oil passage 154. The oil supply port 158 projects downwardly (in the direction of the arrow B), and is arranged in the interior of the inner case 138. An oil guide tube 160 is connected to the oil supply port 158.

The oil guide tube 160 has a predetermined length along the axial direction (the direction of arrows A and B), and in a state of being connected to the oil supply port 158, extends to the vicinity of a bottom part of the inner case 138. Further, a removal filter 162 for removing debris or the like that may be contained within the lubricating oil is disposed on a lower end of the oil guide tube 160.

In addition, lubricating oil that fills the inner case 138, after passing through the oil guide tube 160 and flowing toward the side of the holder 120, passes through the oil passage 154 and is supplied into the reservoir 152. The lubricating oil passes through the drip opening 156 from the reservoir 152 and is dripped into the fourth communication passage 148. As a result, a predetermined amount of lubricating oil is mixed with the pressure fluid that flows through the fourth communication passage 148. A check valve 164 for preventing reverse flow of the lubricating oil toward a side of the inner case 138 from the oil passage 154 is disposed in the oil supply port 158.

The fluid pressure unit 10, to which a case structure according to the first embodiment of the present invention is applied, is constructed basically as described above. Next, explanations shall be made concerning assembly of the filter 12 and the lubricator 16. First, assembly of the filter 12 shall be explained with reference to FIGS. 4 through 6. In the following explanations, it is assumed that the filter unit 24 is in a pre-assembled condition, i.e., in which the filter element 80, the deflector 82 and the baffle 84 already are assembled together (see FIG. 5).

First, the case unit 22 is assembled. In this case, in the condition shown in FIG. 6, the inner case 42 is inserted from above into the interior of the open outer case 40, and bottom portions thereof are placed in proximity, whereby the drain boss 68 is inserted into the boss hole 60. At the same time, the connecting tongues 48a, 48b of the outer case 40 are made to confront the projections 52 of the inner case 42, and the projections 52 are inserted into the holes 54. Consequently, the holes 54 of the connecting tongues 48a, 48b and the projections 52 become engaged, whereby the outer case 40 and the inner case 42 are connected together mutually such that the inner case 42 is accommodated inside the outer case 40.

On this occasion, the outer case 40 and the inner case 42 are connected such that relative displacement in both axial (the direction of arrows A and B) and circumferential directions is regulated, the inner case 42 is covered by the outer case 40, and the inner case 42 is accommodated so as not to be exposed to the exterior of the outer case 40.

Further, the retaining walls 56 of the outer case 40 abut respectively against lower end surfaces on the projections 58 of the inner case 42 (see FIG. 4).

In addition, after the drain cock 46 has been inserted from below with respect to the boss hole 60 of the outer case 40, the drain cock 46 is fixed by the fixing plug 72, and assembly of the case unit 22 is completed by installation of the first sealing ring 66 onto the outer circumferential side of the annular wall 62 of the inner case 42 (see FIGS. 3 and 5).

Figure 5:
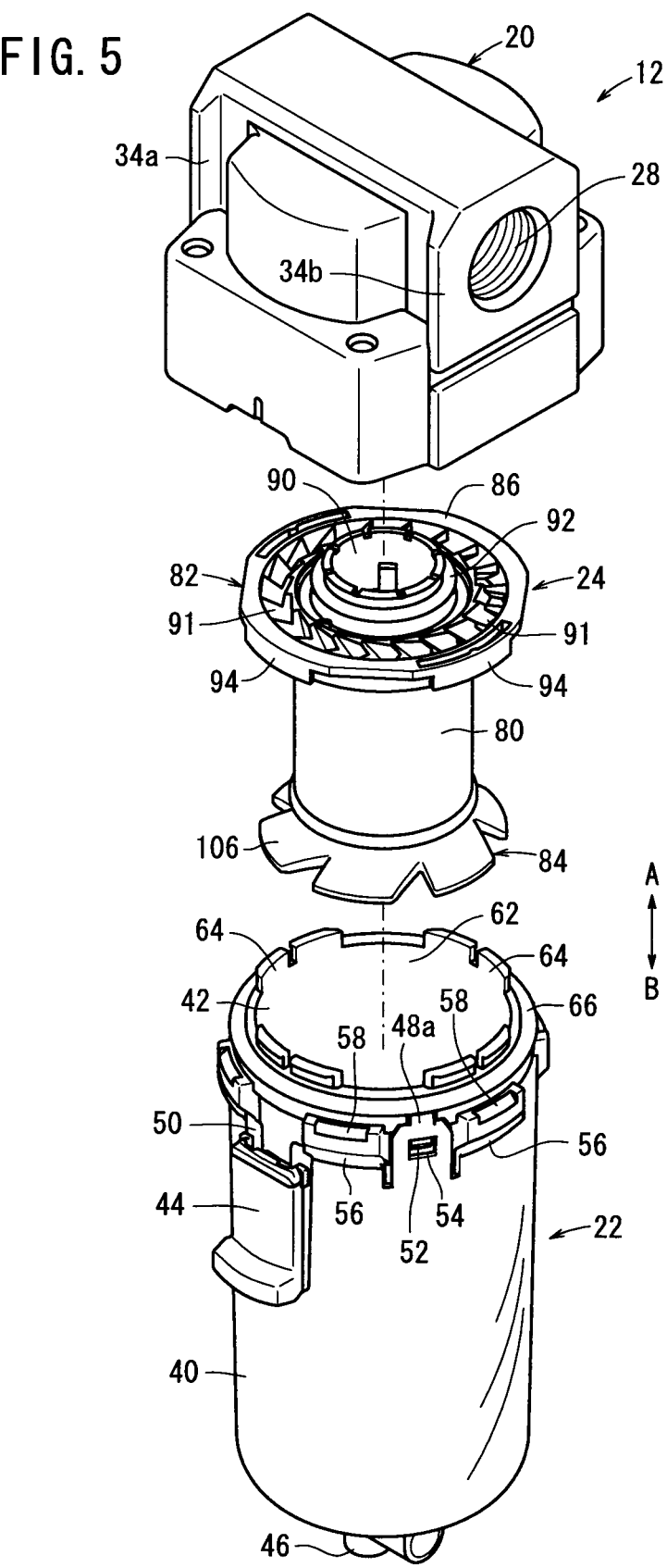
FIG. 5 is an exploded perspective view of a filter that constitutes part of the fluid pressure unit of FIG. 1.
Figure 6:
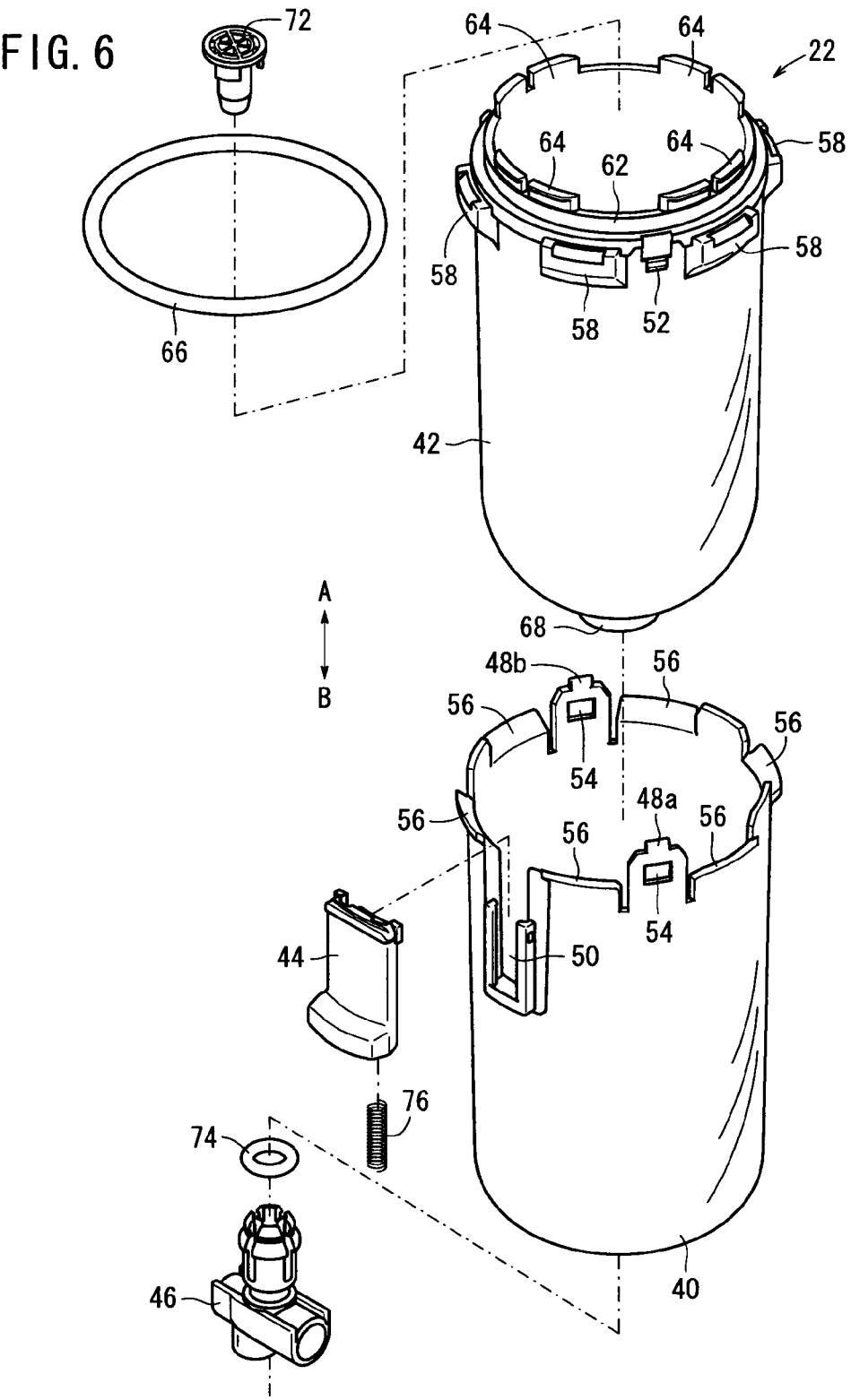
FIG. 6 is an exploded perspective view of a case unit that constitutes part of the filter of FIG. 5.
Figure 7:
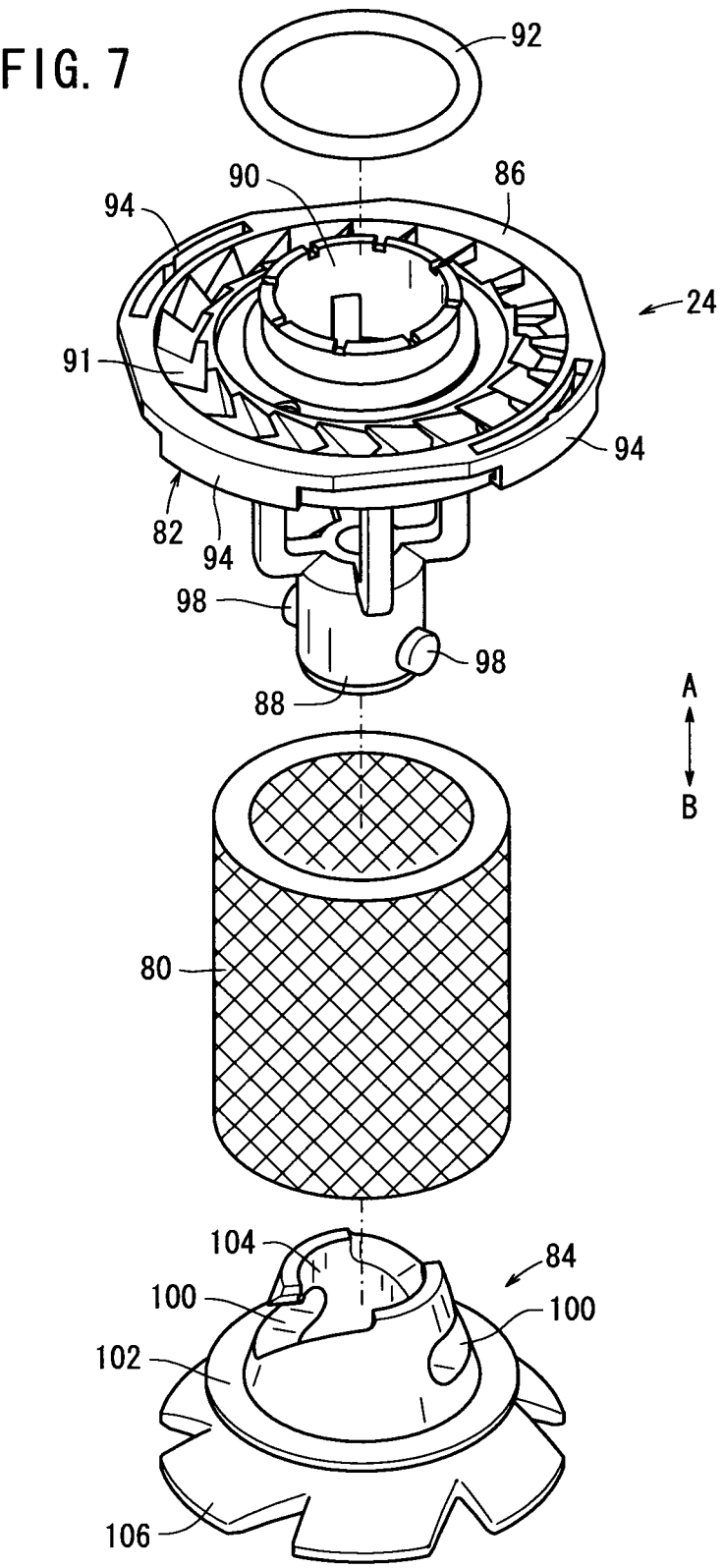
FIG. 7 is an exploded perspective view of a filter unit that constitutes part of the filter of FIG. 5.

Next, from the condition shown in FIG. 5, the filter unit 24 is inserted into the interior of the case unit 22 such that the main body 86 of the deflector 82 is positioned upwardly, and the hooks 64 of the inner case 42 are arranged at positions between the guide walls 94 of the main body 86. In addition, by rotating the filter unit 24 a predetermined angle about its axis with respect to the case unit 22, the hooks 64 are made to confront the guide walls 94 and are moved to positions on inner circumferential sides of the guide walls 94. More specifically, the plural hooks 64 are placed in a state of being covered respectively by the guide walls 94.

Consequently, the upper ends of the hooks 64 are placed in an overlapping state in a radial direction with lower ends of the guide walls 94, whereby displacement in the axial direction (the direction of arrows A and B) between the inner case 42 and the filter unit 24 including the deflector 82 is regulated. As a result, the filter unit 24 is connected together mutually with the case unit 22, with the filter unit 24 being accommodated inside the case unit 22.

Lastly, with the opening thereof being oriented upwardly, the case unit 22 in which the filter unit 24 is assembled is inserted into the installation hole 36 of the first body 20, and the case unit 22 is rotated a predetermined angle about its axis with respect to the first body 20. As a result, the projections 58 and the retaining walls 56 are overlapped in the axial direction (the direction of arrows A and B) with the support members 38, and the projections 58 and the retaining walls 56 are made to engage with the support members 38. At this time, the retaining walls 56, which are in abutment against lower portions of the projections 58, also come into abutment against the support members 38.

Further, at the same time, as shown in FIG. 8A, the release button 44 is moved upwardly (in the direction of the arrow A) by the elastic force of the spring 76 and is inserted into the recess 78 of the installation hole 36. Owing thereto, in a state of being inserted into the installation hole 36 of the first body 20, the case unit 22 is retained by the support members 38 and is prevented from falling out downwardly (in the direction of the arrow B), together with movement of the case unit 22 in a rotational direction (i.e., in the direction of the arrow C in FIG. 3) being regulated by the release button 44. More specifically, because rotation of the case unit 22 with respect to the first body 20 is regulated by the release button 44, the state of engagement with the support members 38 cannot be released.

Owing thereto, the case unit 22 in which the filter unit 24 is accommodated is placed in a state of being connected to the lower portion of the first body 20, whereby assembly of the filter 12 is completed (see FIG. 4). At this time, as shown in FIG. 4, the first communication passage 30 and the fins 91 of the deflector 82 confront and communicate with each other, and the second communication passage 32 communicates with the through hole 90. Further, the first sealing ring 66 abuts against the inner circumferential surface of the installation hole 36, and the third sealing ring 92 abuts against the inner circumferential surface of the second communication passage 32.

As shown in FIG. 8B, if the case unit 22 is to be taken out from the first body 20, the release button 44 is pressed downward against the elastic force of the spring 76, whereby the release button 44 becomes disengaged from the recess 78. Owing thereto, the condition under which rotational displacement of the case unit is prevented becomes released. Thereafter, if the case unit 22 is rotated by a predetermined angle, after the projections 58 and the retaining walls 56 have been released from engagement with the support members 38, the case unit 22 is moved in a direction (the direction of the arrow B) so as to separate away from the first body 20.

Next, an explanation shall be made concerning assembly of the lubricator 16. First, upon assembly of the case unit 116, the inner case 138 is inserted from above into the interior of the open outer case 136, the connecting tongues 48a, 48b of the outer case 136 are placed in confronting relation to the projections 52 of the inner case 138, and the projections 52 are inserted into the holes 54.

Consequently, the holes 54 of the connecting tongues 48a, 48b and the projections 52 become engaged, whereby the outer case 136 and the inner case 138 are connected together mutually such that the inner case 138 is accommodated within the outer case 136. Together therewith, the inner case 138 is covered by the outer case 136, and the inner case 138 is accommodated therein so as not to be exposed to the exterior of the outer case 136.

At this time, the outer case 136 and the inner case 138 are connected such that relative displacement in both axial (the direction of arrows A and B) and circumferential directions is regulated. Further, lower surfaces of the projections 58 of the inner case 138 abut respectively against the retaining walls 56 of the outer case 136.

Upon mounting of the first sealing ring 66 on the outer circumferential side of the annular wall 62 on the inner case 138, assembly of the case unit 116 is completed.

Next, with the opening thereof oriented upwardly, the above-described case unit 116 is inserted into the installation hole 130 of the third body 114, and the case unit 116 is rotated a predetermined angle about its axis with respect to the third body 114. As a result, the projections 58 and the retaining walls 56 are made to engage with the support members 132 provided in the installation hole 130. Further, at the same time, the release button 140 is moved upwardly (in the direction of the arrow A) by the elastic force of the spring 76, and becomes inserted into the recess 78 of the installation hole 130. As a result, under a condition in which the case unit 116 is inserted into the installation hole 130 of the third body 114, the case unit 116 is retained by the support members 132, and is retained in a state whereby the case unit 116 is prevented from falling out downwardly (in the direction of the arrow B), together with movement thereof in a rotational direction being regulated by the release button 140.

More specifically, because rotation of the case unit 116 with respect to the third body 114 is regulated by the release button 140, the state of engagement with the support members 132 is not released.

Owing thereto, under a condition in which the oil guide tube 160 is inserted into the interior of the inner case 138, the case unit 116 is connected to the lower portion of the third body 114, and assembly of the lubricator 16 is completed.

If the case unit 116 is to be taken out from the third body 114, the release button 140 is pressed downward against the elastic force of the spring 76, whereby the release button 140 becomes disengaged from the recess 78. Thus, the condition under which rotational displacement of the case unit 116 is prevented becomes released. Thereafter, if the case unit 116 is rotated by a predetermined angle, after the projections 58 and the retaining walls 56 have been released from engagement with the support members 132, the case unit 116 is moved in a direction (axial direction) so as to separate away from the third body 114.

Next, explanations shall be made concerning operations and advantageous effects of the fluid pressure unit 10 including the filter 12 and the lubricator 16, which are assembled in the foregoing manner. It shall be assumed that unillustrated tubes are connected beforehand to the first port 26 of the filter 12 and the fourth port 124 of the lubricator 16.

First, the pressure fluid is supplied through a tube from a non-illustrated pressure fluid supply source to the first port 26 of the filter 12. After the pressure fluid has flowed to the first communication passage 30 from the first port 26 of the filter 12, the pressure fluid is guided to the interior of the inner case 42 by passing through and between the fins 91 of the deflector 82. At this time, by passing through the plural fins 91, the pressure fluid is guided to the interior of the inner case 42 while being rotated in a circumferential direction about the axis of the inner case 42. Owing thereto, due to centrifugal force caused by such rotation, moisture and the like contained within the pressure fluid is separated radially outwardly and moves toward the inner circumferential side of the inner case 42.

Further, such separated moisture and the like, after having moved downwardly (in the direction of the arrow B) along the inner circumferential wall of the inner case 42, collects in the bottom portion of the inner case 42 and is drained therefrom. By opening of the drain cock 46, moisture and the like to be drained can be discharged to the exterior of the inner case 42.

On the other hand, as a result of the pressure fluid from which moisture and the like has been separated passing from the outer circumferential sides of the filter element 80 and toward the inner circumferential side, dust, particulates and the like contained within the pressure fluid are removed. Thereafter, the pressure fluid, after having risen inside the filter element 80 and been guided via the through hole 90 to the second communication passage 32, is discharged as clean pressure fluid from the second port 28.

In the filter 12, because the outer case 40 and the inner case 42 that constitute the case unit 22 are made from a transparent resin material, which is light-permeable, the amount of moisture to be drained, which is collected inside the filter 12, and the dust and the like adhered to the filter element 80 can easily be confirmed from the exterior of the filter 12.

The pressure fluid, from which moisture, dust and the like has been removed by the filter 12, is supplied from the second port 28 of the filter 12 to the port (not shown) of the regulator 14, which is connected integrally with the filter 12 by the connector 18a. After having been adjusted to a preset pressure value by the handle 110, the adjusted pressure fluid is supplied via the other port thereof to the lubricator 16, which is connected integrally with the regulator 14 by the connector 18b.

Simultaneously with the adjusted pressure fluid being supplied from the third port 122 of the lubricator 16 and flowing to the side of the fourth port 124 through the third and fourth communication passages 126, 148, a portion of the pressure fluid passes through the branch passage 134 that communicates with the third port 122 and is supplied to the interior of the inner case 138. At this time, by means of the damper 150, compared to the pressure fluid flowing directly to the fourth port 124 from the third port 122, the pressure of the pressure fluid, which passes through the branch passage 134 and is guided to the interior of the inner case 138, is made higher.

Owing thereto, the lubricating oil is pressed by the pressure fluid supplied to the interior of the inner case 138, and after passing through the oil guide tube 160 and flowing to the side of the holder 120 (in the direction of the arrow A), the lubricating oil passes through the oil passage 154 and is supplied into the reservoir 152. The oil then passes through the drip opening 156 and is dripped into the fourth communication passage 148. Consequently, if the pressure fluid passes through the interior of the fourth communication passage 148, a predetermined amount of lubricating oil is mixed with the pressure fluid, and thereafter, the pressure fluid is supplied from the fourth port 124 and through a tube to other fluid pressure devices for which lubrication is needed.

Because the outer case 136 and the inner case 138 that constitute the case unit 116 are made from a transparent resin material, which is light-permeable, the amount of lubricating oil filled in the interior of the lubricator 16 can easily be confirmed from the exterior.

In the foregoing manner, according to the first embodiment, in the filter 12 and the lubricator 16, retaining walls 56 are provided, which project in a radial outward direction on outer circumferential sides of the outer cases 40, 136 that constitute the case units 22, 116, and together therewith, projections 58 that abut against upper portions of the retaining walls 56 are provided on the outer circumferential surfaces of the inner cases 42, 138. Additionally, by insertion of the case units 22, 116 into the installation holes 36, 130 of the first and third bodies 20, 114 and rotating the case units 22, 116 through a predetermined angle, and by engagement with the plural support members 38, which are disposed along the inner wall surfaces of the installation holes 36, 130, displacement of the case units 22, 116 in axial directions (the direction of arrows A and B) with respect to the first and third bodies 20, 114 is regulated, and the case units 22, 116 can easily and reliably be connected with respect to the first and third bodies 20, 114.

Further, as a result of engagement of the release buttons 44, 140 provided on the outer cases 40, 136 in the recesses 78 of the first and third bodies 20, 114, because rotational displacement of the case units 22, 116 with respect to the first and third bodies 20, 114 is regulated, mistaken rotation of the case units 22, 116 and unintended releasing of the state of engagement of the retaining walls 56 and the projections 58 with respect to the support members 38 is prevented. As a result, by engagement of the release buttons 44, 140 in the recesses 78, the state of connection of the case units 22, 116 with respect to the first and third bodies 20, 114 can be maintained reliably.

Furthermore, in the case unit 22 that constitutes the filter 12, the inner case 42 to which the pressure fluid is guided, and the outer case 40, which is disposed on the exterior side of the inner case 42, are formed respectively from a light-permeable transparent material. As a result, the amount of moisture to be drained, which is collected inside the inner case 42, and the amount of dust and the like adhering to the filter element 80 can reliably and easily be confirmed visually from the exterior of the case unit 22.

In further detail, even when observed from any arbitrary position along the circumferential direction of the case unit 22, the interior of the case unit 22 can reliably be confirmed. Therefore, for example, even in cases where positions that enable visibility are limited due to the installation environment of the fluid pressure unit 10 including the filter 12, the amount of moisture to be drained or the like in the interior of the case unit 22 can be visually confirmed reliably. Owing thereto, maintenance operations, such as replacement of the filter element 80 or discharging of moisture by operation of the drain cock 46, can be carried out at an appropriate timing.

More specifically, by enabling observation and confirmation of the condition of adhered dust or the like, clogging of the filter element 80 can be avoided, and collection of moisture to be drained inside the inner case 42 in excess of a predetermined amount can also be avoided.

Still further, in the case unit 116 constituting the lubricator 16, the inner case 138 in which lubricating oil is filled, and the outer case 136 disposed on the outer side of the inner case 138 are formed respectively from a light-permeable transparent material. Owing thereto, the filled amount of lubricating oil inside the inner case 138 can reliably and easily be confirmed from the exterior of the case unit 116.

In greater detail, because the interior of the case unit 116 can reliably be confirmed visually when viewed from any arbitrary position along the circumferential direction of the case unit 116, for example, even in cases in which the positions capable of being viewed are limited due to the installation environment of the fluid pressure unit 10 including the lubricator 16, the filled amount of lubricating oil in the interior of the case unit 116 can reliably be confirmed visually. Consequently, maintenance operations such as replenishment of the lubricating oil or the like can be carried out at a suitable timing.

Further, with the case unit 22 constituting the filter 12, and the case unit 116 constituting the lubricator 16, a structure is provided in which the outer cases 40, 136 are disposed to cover outer circumferential sides of the inner cases 42, 138, such that the inner cases 42, 138 are not exposed to the exterior. Owing thereto, in an installation environment of the fluid pressure unit 10, in which gases, solvents, etc., are suspended or dispersed in the atmosphere, such gases, solvents or the like can be prevented from coming into contact and adhering with respect to the inner cases 42, 138. As a result, the durability of the inner cases 42, 138 can be enhanced.

The case units 22, 116 that make up the filter 12 and the lubricator 16 are not limited to being formed from light-permeable transparent resin materials. For example, the case units 22, 116 may be formed from pressure resistant glass, or instead of transparent materials, may be formed from semi-transparent materials. More specifically, the outer cases 40, 136 and the inner cases 42, 138 constituting the case units 22, 116 may be made from any materials that are capable of withstanding the pressure applied thereto, and which enable the interior thereof to be confirmed visually from the exterior.

Figure 11:
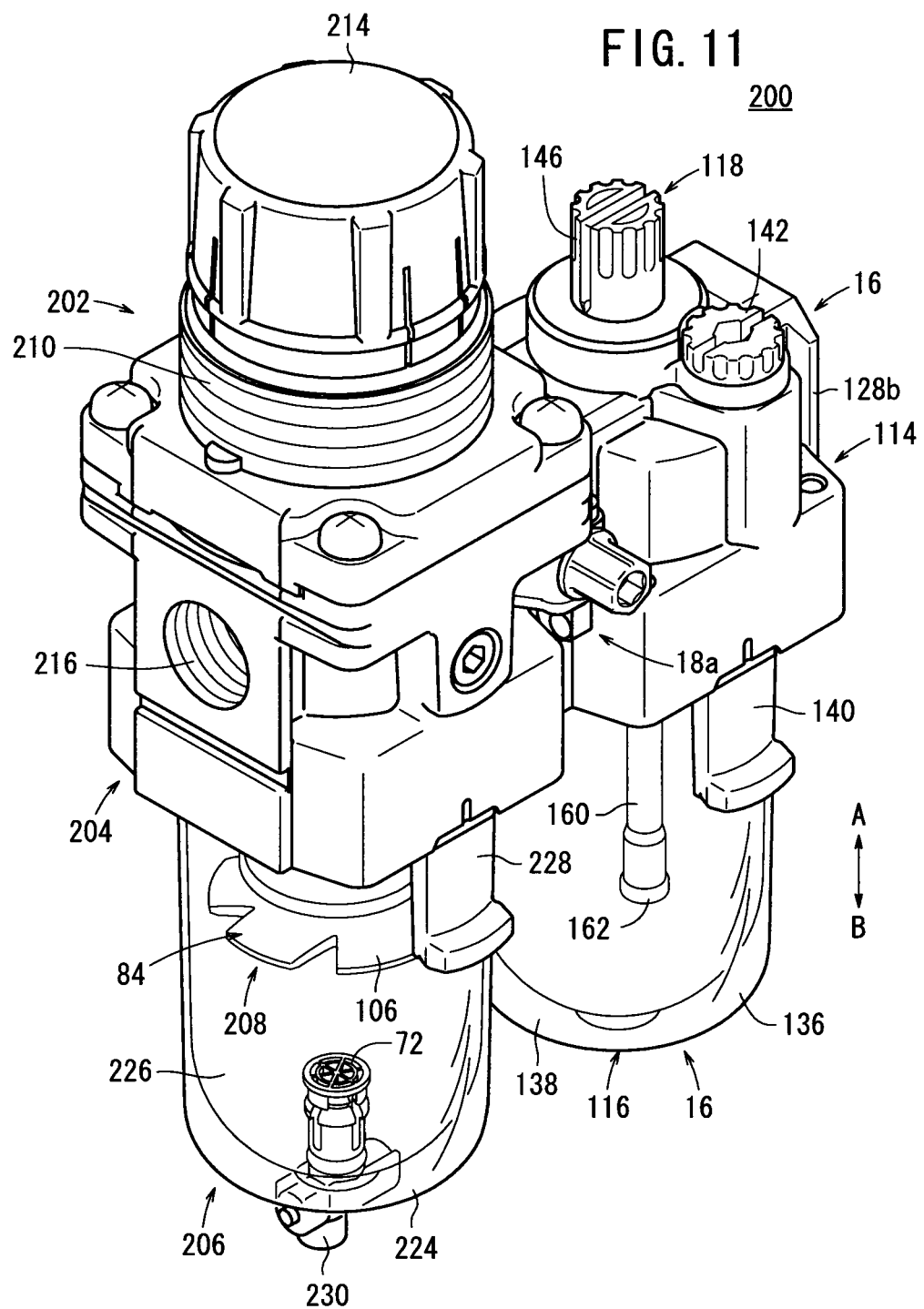
FIG. 11 is an exterior perspective view of a fluid pressure unit to which a case structure according to a second embodiment of the present invention is applied.
Figure 12:
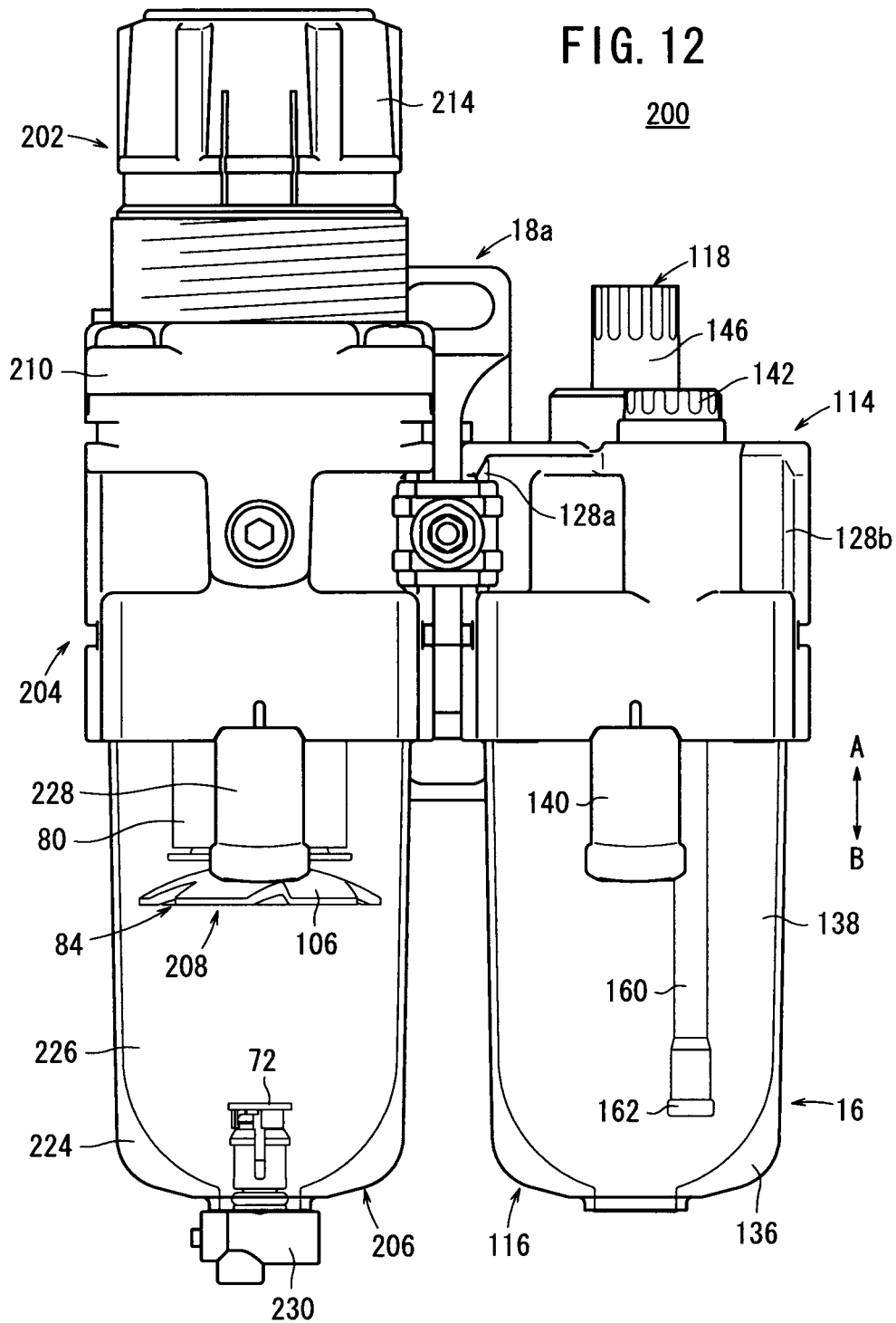
FIG. 12 is a front view of the fluid pressure unit shown in FIG. 11.
Figure 13:
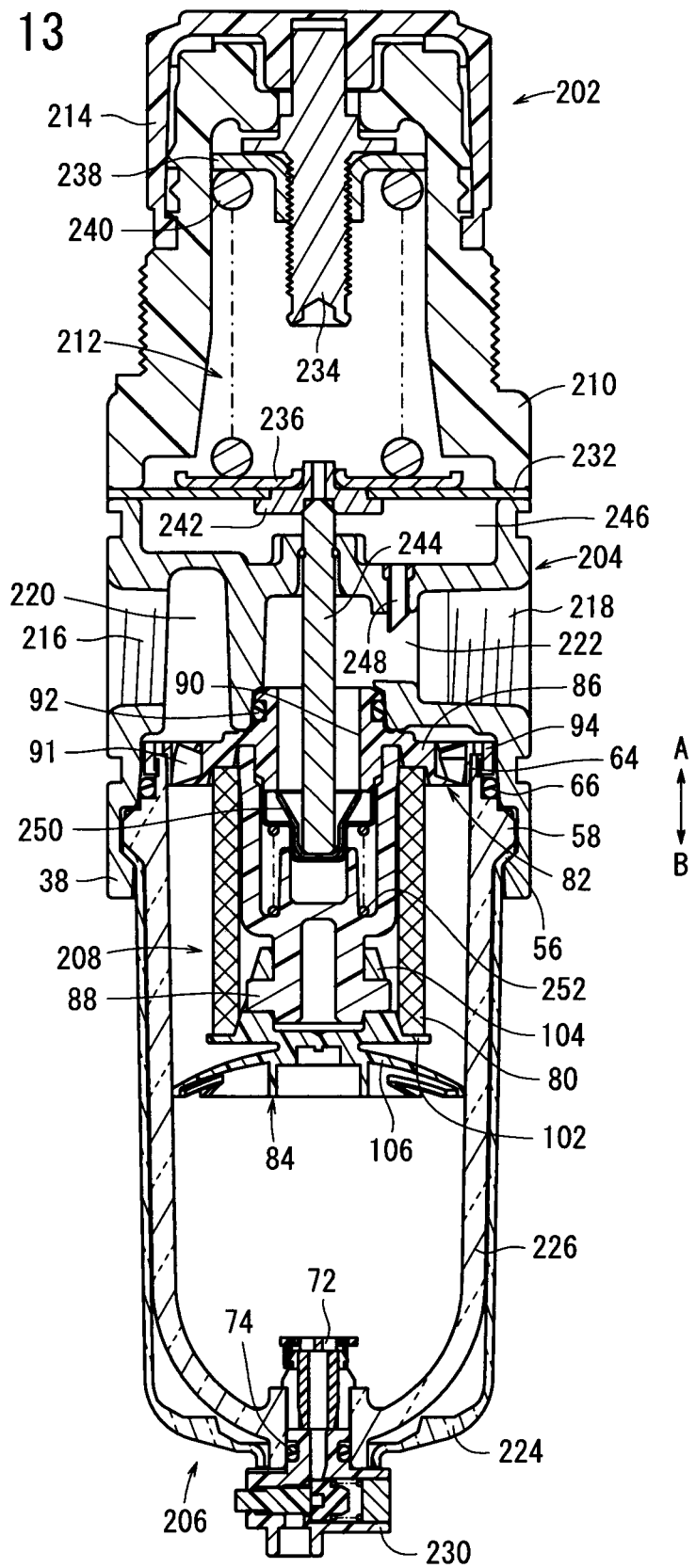
FIG. 13 is an overall cross sectional view of a filter-regulator that constitutes part of the fluid pressure unit of FIG. 12.

Next, a fluid pressure unit 200, including fluid pressure devices to which a case structure according to a second embodiment is applied, is shown in FIGS. 11 through 13. Constituent elements, which are the same as those of the fluid pressure unit 10 according to the aforementioned first embodiment, are designated by the same reference characters, and detailed explanations of such elements are omitted.

In the fluid pressure unit 200 according to the second embodiment, the fluid pressure devices thereof differ from the fluid pressure devices of the first embodiment, in that a filter-regulator 202 is provided in which a filter for removal of dust, particulates and the like contained in the pressure fluid, and a regulator for reducing the pressure of the pressure fluid are disposed together integrally.

As shown in FIGS. 11 through 13, the fluid pressure unit 200 is constituted from the filter-regulator 202, a lubricator 16 connected to the filter-regulator 202 for mixing a lubricating oil with respect to the pressure fluid, and a connector 18a by which the filter-regulator 202 and the lubricator 16 are mutually connected. The aforementioned filter-regulator 202 and the lubricator 16 function as fluid pressure devices to which a pressure fluid is supplied to interior portions thereof.

Concerning the lubricator 16, since the structure thereof is the same as that of the lubricator 16 in the fluid pressure unit 10 according to the above-described first embodiment, detailed explanations thereof are omitted.

The filter-regulator 202 includes a body 204, a case unit (case) 206 connected to a lower part of the body 204, a filter unit 208 installed in the interior of the case unit 206, a bonnet 210 connected to an upper part of the body 204, an adjustment mechanism 212 disposed in the interior of the bonnet 210, and a handle 214 disposed rotatably on an upper portion of the bonnet 210.

The body 204 comprises fifth and sixth ports 216, 218 through which the pressure fluid is supplied and discharged, a fifth communication passage 220 communicating with the fifth port 216, and a sixth communication passage 222 communicating with the sixth port 218.

The case unit 206 includes an outer case (first case portion) 224 formed as a bottomed cylinder, and inner case (second case portion) 226 that is inserted into an interior of the outer case 224, a release button 228 disposed for displacement with respect to the outer case 224, and a drain cock 230 disposed on bottom parts of the outer case 224 and the inner case 226.

The structure of the case unit 206 and the filter unit 208 is the same as in the filter 12 according to the above-described first embodiment, and therefore, detailed explanation of such features is omitted.

The bonnet 210 is formed in a cylindrical shaped and is connected to an upper part of the body 204, sandwiching a diaphragm 232 that makes up the adjustment mechanism 212. Further, the handle 214 is disposed rotatably through a rotary shaft 234 on an upper portion of the bonnet 210. A spring 240 is interposed via a spring holder 238 between the rotary shaft 234 and a disk member 236, which constitute parts of the adjustment mechanism 212.

In addition, by rotating the handle 214, the rotary shaft 234 is rotated integrally therewith, accompanied by the spring holder 238, which is screw-engaged with the rotary shaft 234, being displaced along the axial direction (in the direction of arrows A and B), whereby the spring 240 is compressed, for example, via the spring holder 238, and a pressing force from the spring 240 is applied to the diaphragm 232.

The adjustment mechanism 212 includes the diaphragm 232 in the form of a thin membrane having elasticity, and sandwiched between the body 204 and the bonnet 210, a retaining member 242 that retains a center portion of the diaphragm 232, the spring holder 238, which is disposed upwardly of the retaining member 242 while the diaphragm 232 is disposed between the retaining member 242 and the spring holder 238, and a shaft 244 provided on a lower portion of the retaining member 242.

A diaphragm chamber 246 is formed on a lower portion of the diaphragm 232 between the diaphragm 232 and the body 204. The diaphragm chamber 246 communicates through a pilot passage 248 with the sixth communication passage 222.

Further, on a lower end of the shaft 244, a shaft holder 250, which is disposed between the main body 86 of the deflector 82 and the retaining member 88, abuts thereagainst, and a return spring 252 is interposed between the shaft holder 250 and the retaining member 88. By an elastic force of the return spring 252, the shaft 244 is urged upwardly (in the direction of the arrow A) via the shaft holder 250, whereas the upper end of the shaft 244 abuts against a center portion of the retaining member 242.

Next, explanations shall be made concerning operations and advantageous effects of the fluid pressure unit 200 according to the second embodiment. It is assumed that a desired pressure has been set beforehand by operating the handle 214.

First, the pressure fluid is supplied from a non-illustrated pressure fluid supply source to the fifth port 216 of the body 204. The pressure fluid flows to the interior of the inner case 226 by passing through the fifth communication passage 220, and is guided downward while undergoing rotation by passing between the fins 91 of the deflector 82. On this occasion, moisture and the like contained within the pressure fluid are suitably separated out due to centrifugal force caused by such rotation, and the pressure fluid moves toward the inner circumferential side of the inner case 226.

Further, the separated moisture, after moving downward along the inner circumferential surface of the inner case 226, collects as moisture to be drained in the bottom of the inner case 226. By opening the drain cock 230, the moisture to be drained can be discharged to the exterior of the inner case 226.

On the other hand, the pressure fluid, from which moisture and the like has been separated out, passes to the inner circumferential side from the outer circumferential side of the filter element 80, wherein dust, particulates and the like contained within the pressure fluid are suitably removed, and thereafter, the pressure fluid rises inside the filter element 80 and flows into the sixth communication passage 222. Because the outer case 224 and the inner case 226 that make up the case unit 206 are formed from a light-permeable transparent resin material, the moisture to be drained, which has collected in the interior thereof, as well as dust and the like, can be observed visually from the exterior.

Further, at the same time, due to a difference between a pressing force applied to the diaphragm 232 from the spring 240 and the pressure acting on the diaphragm 232 from the pressure fluid inside the diaphragm chamber 246, the shaft 244 is displaced in the axial direction (the direction of arrows A and B), whereby the pressure fluid is adjusted to a desired pressure. In addition, after moisture and dust, etc., have been removed therefrom, and after being adjusted to a predetermined pressure, the pressure fluid is supplied through the sixth port 218 to the adjacent lubricator 16.

The pressure fluid supplied to the lubricator 16, after a predetermined amount of lubricating oil has been dripped and mixed therewith in the interior of the lubricator 16, is supplied to other fluid pressure devices for which lubrication is required.

In the foregoing manner according to the second embodiment, in the filter-regulator 202, retaining walls 56 are provided that project radially outward on the outer circumferential surface of the outer case 224 of the case unit 206, and together therewith, projections 58, which abut against upper portions of the retaining walls 56, are provided on the outer circumferential surface of the inner case 226. In addition, by insertion of the case unit 206 into the installation hole 36 of the body 204, and by rotating the case unit 206 through a predetermined angle so as to cause engagement with the plural support members 38 disposed along the inner circumferential surface of the installation hole 36, displacement in the axial direction (the direction of arrows A and B) of the case unit 206 with respect to the body 204 is regulated, and the case unit 206 can easily and reliably be connected with respect to the body 204.

Further, by engagement of the release button 228 disposed on the outer case 224 with the recess 78 of the body 204, because rotational displacement of the case unit 206 with respect to the body 204 is regulated, mistaken rotation of the case unit 206 and unintended releasing of the state of engagement of the retaining walls 56 and the projections 58 with respect to the support members 38 are prevented. As a result, by engagement of the release button 228 in the recess 78, the state of connection of the case unit 206 with respect to the body 204 can be maintained reliably.

Furthermore, in the case unit 206, the inner case 226 into which the pressure fluid is guided, and the outer case 224 disposed on the outer side of the inner case 226 are formed respectively from a light-permeable transparent resin material. Owing thereto, the amount of moisture to be drained, which is collected inside the inner case 226, and the amount of dust or the like that adheres to the filter element 80 can reliably and easily be confirmed visually from the exterior of the case unit 206.

More specifically, because the interior of the case unit 206 can be reliably confirmed when viewed from any arbitrary position along the circumferential direction of the case unit 206, for example, even in the case that positions where the case unit 206 can be viewed are limited due to the installation environment of the fluid pressure unit 200 including the filter-regulator 202, the amount of moisture or the like to be drained in the interior of the case unit 206 can be visually confirmed. Owing thereto, maintenance operations, such as replacing the filter element 80 or discharging of moisture by means of the drain cock 230, can be carried out at an appropriate timing.

Further, the outer case 224 is disposed so as to cover the outer circumferential side of the inner case 226, and the case unit 206 is constructed such that the inner case 226 is not exposed to the exterior. Therefore, in an installation environment of the fluid pressure unit 200 in which gases, solvents, etc., are suspended or dispersed in the atmosphere, such gases, solvents or the like can be prevented from coming into contact and adhering with respect to the inner case 226. As a result, the durability of the inner case 226 can be enhanced.

The case structure according to the present invention is not limited to the above-described embodiments, and it is a matter of course that various additional or modified structures could be adopted therein without departing from the essence of the invention as set forth in the appended claims.

The invention claimed is:

1. A case structure for a fluid pressure device having a case into which a pressure fluid is introduced to an interior thereof, the fluid pressure device comprising:
a body having ports through which the pressure fluid is supplied and discharged; and
the case formed as a bottomed cylinder, which is connected to an installation hole of the body, the interior of the case communicating with the ports,
wherein the case comprises a first case portion and a second case portion disposed in an interior of the first case portion, the first case portion being light-permeable around an entire circumference thereof so as to enable visibility of the second case portion and of the interior of the case, and the second case portion being light-permeable around an entire circumference thereof so as to enable visibility of the interior of the case, and
wherein a first engagement member, which is disposed on an outer circumferential surface of at least one of the first case portion and the second case portion, engages with a second engagement member formed on an inner circumferential surface of the installation hole.

2. The case structure according to claim 1, wherein the first engagement member projects in a radial outward direction with respect to an outer circumferential surface of the case, and the second engagement member is formed to project in a radially inward direction with respect to the inner circumferential surface, and wherein the first engagement member and the second engagement member are engaged by rotating the case with respect to the body inside the installation hole.

3. The case structure according to claim 2, further comprising a stopper member disposed on the case for regulating relative rotational displacement between the case and the body.

4. The case structure according to claim 3, wherein the stopper member comprises an operation button, which is displaceable in an axial direction of the case, and wherein by insertion of the operation button into a recess of the body, rotational displacement with respect to the body is regulated.

5. The case structure according to claim 1, wherein the fluid pressure device comprises a filter having a filter element accommodated in the interior of the case, which is capable of removing dust or the like contained in the pressure fluid.

6. The case structure according to claim 1, wherein the fluid pressure device comprises a lubricator in which the interior of the case is filled with a lubricating oil, and which mixes the lubricating oil with the pressure fluid and discharges the pressure fluid mixed with the lubricating oil from the port.

7. The case structure according to claim 1, wherein the fluid pressure device comprises a filter-regulator equipped with a filter element accommodated in the interior of the case, and with an adjustment mechanism that is capable of adjusting a pressure of the pressure fluid in the body.

8. The case structure according to claim 1, wherein the first case portion and the second case portion are formed from a transparent resin material.

9. The case structure according to claim 8, wherein the transparent resin material is an acrylic material or a polycarbonate material.

* * * * *